US011367953B2

(12) United States Patent
Shimura

(10) Patent No.: US 11,367,953 B2
(45) Date of Patent: Jun. 21, 2022

(54) ANTENNA DEVICE AND CALIBRATION METHOD

(71) Applicant: FUJITSU LIMITED, Kawasaki (JP)

(72) Inventor: Toshihiro Shimura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/039,296

(22) Filed: Sep. 30, 2020

(65) Prior Publication Data
US 2021/0075102 A1  Mar. 11, 2021

Related U.S. Application Data

(63) Continuation of application No. PCT/JP2018/015327, filed on Apr. 12, 2018.

(51) Int. Cl.
*H04B 17/12* (2015.01)
*H01Q 3/26* (2006.01)
(Continued)

(52) U.S. Cl.
CPC ............. *H01Q 3/267* (2013.01); *H01Q 3/28* (2013.01); *H01Q 3/38* (2013.01); *H04B 17/103* (2015.01);
(Continued)

(58) Field of Classification Search
CPC ........... H01Q 3/267; H01Q 3/28; H01Q 3/38; H01Q 1/246; H04B 17/103; H04B 17/12; H04B 7/06; H04B 7/08; H04L 25/0272
(Continued)

(56) References Cited

U.S. PATENT DOCUMENTS 5,412,414 A  5/1995  Ast et al.
6,400,318 B1*  6/2002  Kasami ............... H01Q 3/2605
                                                342/372
(Continued)

FOREIGN PATENT DOCUMENTS

JP  8-226962 A  9/1996
JP  2002-100919 A  4/2002
(Continued)

OTHER PUBLICATIONS

International Search Report and Written Opinion, issued by International Searching Authority in corresponding International Application No. PCT/JP2018/015327, dated Jul. 10, 2018.

*Primary Examiner* — Don N Vo
(74) *Attorney, Agent, or Firm* — ArentFox Schiff LLP

(57) ABSTRACT

An antenna device includes: a first variable phase amplifier that outputs a first signal to a first transmission line without outputting a second signal to a second transmission line; a second variable phase amplifier that outputs a fourth signal to a fourth transmission line without outputting a third signal to a third transmission line; a phase comparator that acquires a first reflected signal that is obtained by reflecting the first signal by a first antenna element from the second transmission line, acquires a second reflected signal that is obtained by reflecting the fourth signal by a second antenna element from the third transmission line, and detects a phase difference between the first and the second antenna elements based on the first and the second reflected signals; and a phase amplitude controller that calibrates a phase between the first and the second antenna elements based on the detected phase difference.

11 Claims, 12 Drawing Sheets

(51) Int. Cl.
H04B 17/10 (2015.01)
H01Q 3/28 (2006.01)
H01Q 3/38 (2006.01)
H01Q 1/24 (2006.01)
H04L 25/02 (2006.01)

(52) U.S. Cl.
CPC ............. *H04B 17/12* (2015.01); *H01Q 1/246* (2013.01); *H04L 25/0272* (2013.01)

(58) Field of Classification Search
USPC ......................................................... 375/226
See application file for complete search history.

(56) References Cited

U.S. PATENT DOCUMENTS 7,429,947 B2 * 9/2008 Shima .................... G01S 7/4021
342/174
2019/0312465 A1 * 10/2019 Yeo .......................... H02J 50/20

FOREIGN PATENT DOCUMENTS

| JP | 2009-278529 A | 11/2009 |
| JP | 2013-152135 A | 8/2013 |
| JP | 2016-122895 A | 7/2016 |
| JP | 2017-005656 A | 1/2017 |

* cited by examiner

US 11,367,953 B2

ANTENNA DEVICE AND CALIBRATION METHOD

CROSS-REFERENCE TO RELATED APPLICATION

This application is a continuation application of International Application PCT/JP2018/015327 filed on Apr. 12, 2018 and designated the U.S., the entire contents of which are incorporated herein by reference.

FIELD

The embodiments discussed herein are related to an antenna device and a calibration method.

BACKGROUND

In a high frequency band, in particular, in a millimeter wave frequency band (for example, 30 GHz to 300 GHz, or the like), a wavelength is shorter than that in the lower frequency band. Therefore, it is possible to reduce a size of an antenna and form a narrow beam. Therefore, in recent years, communication is multiplexed by using a plurality of antenna elements.

Japanese Laid-open Patent Publication No. 2002-100919, Japanese Laid-open Patent Publication No. 08-226962, and Japanese Laid-open Patent Publication No. 2013-152135 are disclosed as related art.

SUMMARY

According to an aspect of the embodiments, an antenna device includes: a first variable phase amplifier that outputs a first signal to a first transmission line without outputting a second signal to a second transmission line; a second variable phase amplifier that outputs a fourth signal to a fourth transmission line without outputting a third signal to a third transmission line; a phase comparator that acquires a first reflected signal that is obtained by reflecting the first signal by a first antenna element from the second transmission line, acquires a second reflected signal that is obtained by reflecting the fourth signal by a second antenna element from the third transmission line, and detects a phase difference between the first and the second antenna elements on the basis of the first and the second reflected signals; and a phase amplitude controller that calibrates a phase between the first and the second antenna elements on the basis of the detected phase difference, signals in opposite phases are output to the first antenna element via the first and the second transmission lines connected to the first antenna element or signals in opposite phases are input from the first antenna element to the first and the second transmission lines, and signals in opposite phases are output to the second antenna element via the third and the fourth transmission lines connected to the second antenna element or signals in opposite phases are input to the third and the fourth transmission lines from the second antenna element.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1A:
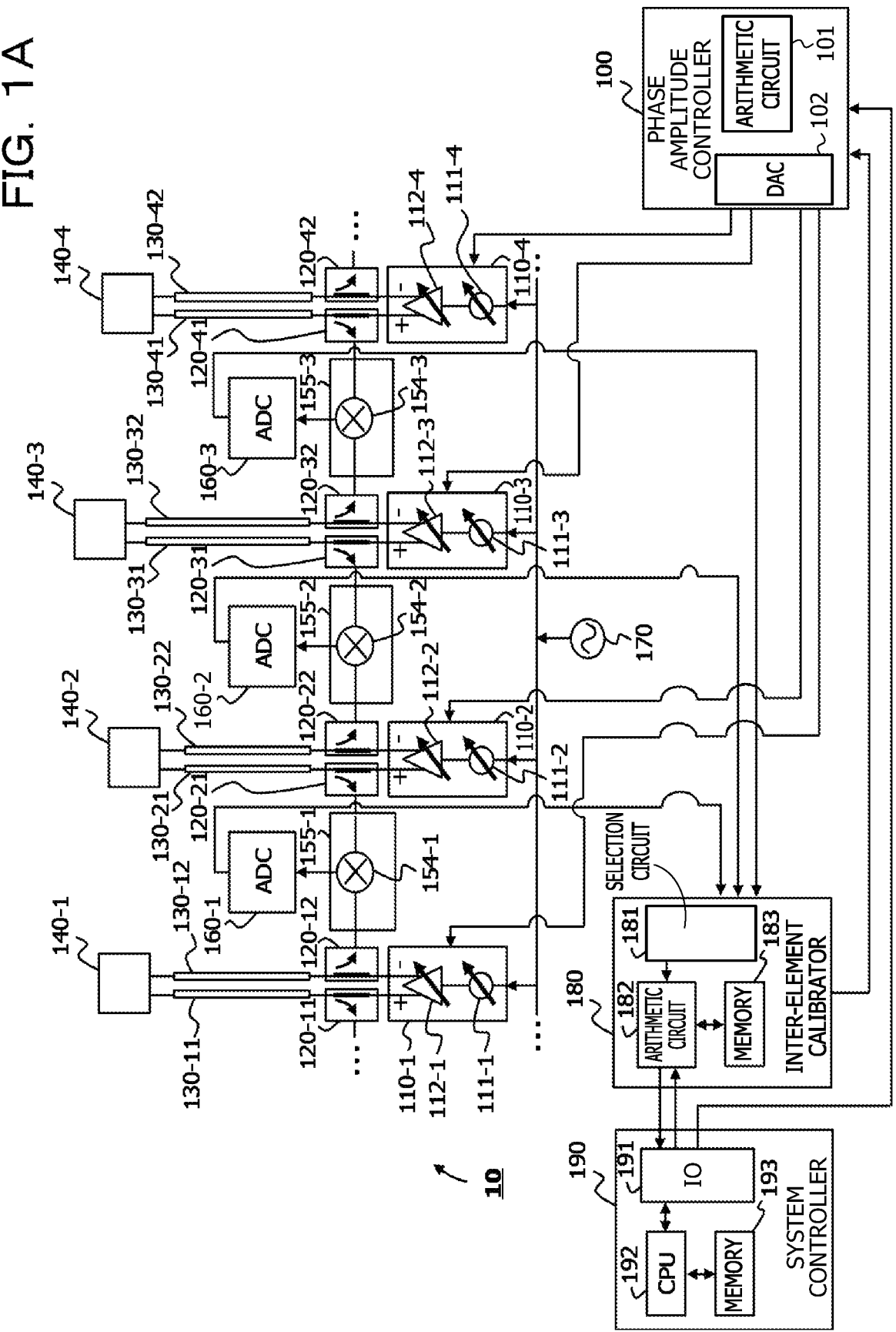
FIG. 1A is a diagram illustrating an exemplary configuration of an antenna device.

A base station device may perform wireless communication with a terminal device by applying beamforming on an array antenna. The array antenna is an antenna, in which, for example, a plurality of antenna elements is regularly arranged, that can electrically control a phase and an amplitude of a transmission signal that is input to the antenna element. Furthermore, the beamforming indicates, for example, a technique that controls the phase and the amplitude. By performing the beamforming, for example, the base station device can transmit a wireless signal to a direction where the terminal device exists or receive a wireless signal transmitted from the direction where the terminal device exists.

In a case where a plurality of antenna elements is disposed in the base station device, phases and amplitudes of transmission signals to be input to input ends of the antenna elements are different from each other due to a difference in characteristics of an analog element connected to each antenna element. Therefore, there is a case where the base station device performs calibration. For example, the calibration indicates a technique that performs phase correction or amplitude correction so as to match the phases or the amplitudes that are different for each antenna element. By performing the calibration, for example, the phases and the amplitudes of the transmission signals at the input ends of the respective antenna elements match, and it is possible to improve accuracy of the beamforming.

On the other hand, there is an antenna device that connects two lines to the antenna element and transmits two differential signals (or transmission signals) having opposite phases to the antenna element. Even when the differential signal causes a noise in the signals, for example, it is possible to reduce the noise by canceling the noises each other.

For example, techniques regarding such an antenna device are as follows. For example, there is a phased array antenna device that detects an abnormality in a transmission or a reception operation of a regular module by spatially coupling a regular antenna element with a monitoring antenna element so as to make the antenna elements transmit and receive test signals and monitoring an output of a reception-side module by a monitor signal processing device.

According to this technique, it is possible to realize a transmission and reception module with a simple configuration and reduce a deviation of monitor signal strengths of all the transmission and reception modules in a transmission and reception monitor.

Furthermore, there is a self-monitoring and calibration phased array radar that supplies power to one of four dipole elements during transmission path calibration, extracts an exciter signal along the calibration path by a directional coupler immediately below the dipole element, and performs calibration by a calibration error detection circuit.

According to this technology, it is possible to provide a phased array radar device that has a new unit for monitoring and calibrating a behavior path between a receiver/an exciter and each antenna element.

Moreover, there is a calibration path measurement device that switches a signal switch to an all reflection state at the time of measuring the calibration path, measures a phase difference and amplitude ratio between a calibration signal and a reflected signal, and subtracts a result of multiplying each measurement value by ½ from the measurement result at the time of calibration of an antenna module.

According to this technique, it is possible to obtain the calibration path measurement device of the phased array antenna that has a function for detecting an error in the calibration path.

In the phased array antenna device that detects an abnormality in the transmission or the reception operation of the regular module by using the monitoring antenna element, the monitoring antenna element is provided in the device. Therefore, the size of the phased array antenna device is larger than that in a case where the monitoring antenna element is not provided. Furthermore, at the time of a normal operation, the monitoring antenna element becomes a radiation element of a signal transmitted from a regular antenna. There is a case where a larger effect is applied to the signal transmitted from the regular antenna, as the distance between the regular antenna and the monitoring antenna element is shorter. On the other hand, in a case where the regular antenna is separated from the monitoring antenna element by equal to or more than a certain distance, there is a case where a reception level of the monitoring antenna element becomes equal to or less than a certain level and accuracy of the calibration is deteriorated.

Furthermore, in any one of the techniques, how to perform the calibration on the antenna device that transmits the differential signal to the antenna element is not discussed. Therefore, according to the described techniques, there is a case where it is not possible to improve the accuracy of the calibration in such an antenna device.

Therefore, an antenna device and a calibration method that improve the accuracy of the calibration may be provided.

Furthermore, an antenna device and a calibration method that suppress an increase in a device size may be provided.

Hereinafter, embodiments will be described in detail with reference to the drawings. Problems and examples in the present specification are merely examples, and do not limit the scope of rights of the present application. For example, as long as the described expressions are technologically equivalent even if different described expressions are used, the technologies of the present application can be applied and the scope of rights is not limited even if the expressions are different. Then, each of the embodiments can be appropriately combined within a range without causing contradiction between individual processing content.

Furthermore, for terms used herein and technical content described herein, terms and technical content described in specifications and contributions as standards regarding communication such as the 3GPP may be appropriately used.

First Embodiment

<Exemplary Configuration of Antenna Device>

FIG. 1A is a diagram illustrating an exemplary configuration of an antenna device 10 according to a first embodiment. The antenna device 10 may be included in, for example, a wireless base station device or a terminal device. As the terminal device, for example, a smartphone, a feature phone, a tablet terminal, a game machine, or the like are exemplified. Hereinafter, description will be made as assuming that the antenna device 10 is included in the wireless base station device and a communication partner is the terminal device.

As illustrated in FIG. 1A, the antenna device 10 includes a phase amplitude controller 100, a plurality of variable phase amplifiers 110-1 to 110-4, and a plurality of branch units 120-11, 120-12, . . . , 120-41, and 120-42. Furthermore, the antenna device 10 includes a plurality of antenna feed lines (or transmission lines or differential lines) 130-11, 130-12, . . . , 130-41, and 130-42, a plurality of antenna elements 140-1 to 140-4, and a plurality of phase comparators 155-1 to 155-3. Moreover, the antenna device 10 includes a plurality of Analogue to Digital Converters (ADC) 160-1 to 160-3, an oscillator 170, an inter-element calibrator 180, and a system controller 190.

When receiving an input of an instruction signal output from the system controller 190, the phase amplitude controller 100 sets a phase and an amplitude to each of the variable phase amplifiers 110-1 to 110-4 according to the instruction signal. Then, the phase amplitude controller 100 outputs the instruction signal including the set phase and the set amplitude to each of the variable phase amplifiers 110-1 to 110-4. With this operation, the phase amplitude controller 100 can make the variable phase amplifiers 110-1 to 110-4 perform beamforming.

Furthermore, when receiving an instruction signal output from the inter-element calibrator 180, the phase amplitude controller 100 determines a combination of the antenna elements 140-1 to 140-4 that performs calibration (or calibration, hereinafter, may be referred to as "calibration") according to the instruction signal. Then, the phase amplitude controller 100 outputs, for example, an instruction signal for instructing to perform the calibration to two of the variable phase amplifiers 110-1 to 110-4 connected to the determined antenna elements 140-1 to 140-4.

The phase amplitude controller 100 includes an arithmetic circuit 101 and a Digital to Analogue Converter (DAC) 102.

For example, upon receiving instruction signals from the system controller 190 and the inter-element calibrator 180, the arithmetic circuit 101 sets the phase and the amplitude of each of the variable phase amplifiers 110-1 to 110-4 and determines the combination of the antenna elements 140-1 to 140-4 that perform the calibration. Upon receiving the phase and the amplitude for beamforming for each of the variable phase amplifiers 110-1 to 110-4 from the arithmetic circuit 101, the DAC 102 converts that information into an analog signal and outputs the converted analog signal to the variable phase amplifiers 110-1 to 110-4 to be targets as an instruction signal. Furthermore, upon receiving the information regarding the antenna elements 140-1 to 140-4 to be calibrated from the arithmetic circuit 101, the DAC 102 converts that information into an analog signal and outputs the converted analog signal to the variable phase amplifiers 110-1 to 110-4 to be targets as an instruction signal.

The variable phase amplifiers 110-1 to 110-4 respectively include variable phase shifters 111-1 to 111-4, and variable amplifiers 112-1 to 112-4 (or variable amplifier, hereinafter, may be referred to as "variable amplifier").

At the time of a normal operation (or beamforming operation, hereinafter, may be referred to as "normal operation"), the variable phase shifters 111-1 to 111-4 and the variable amplifiers 112-1 to 112-4 operate as follows, for example.

For example, the variable phase shifters 111-1 to 111-4 control (or change) a phase of an input wireless signal according to the instruction signal output from the phase amplitude controller 100. Then, the variable phase shifters 111-1 to 111-4 respectively output the wireless signals of which the phases are controlled to the variable amplifiers 112-1 to 112-4. Each of the variable amplifiers 112-1 to 112-4 controls an amplitude of the wireless signal of which the phase is controlled according to the instruction signal output from the phase amplitude controller 100. Each of the variable amplifiers 112-1 to 112-4 converts the wireless signal of which the phase and the amplitude are controlled into a first differential signal and a second differential signal having an inverted phase of the first differential signal. The variable amplifiers 112-1 to 112-4 respectively output the first differential signals to the antenna feed lines 130-11, 130-21, 130-31, and 130-41 via the branch units 120-11, 120-21, 120-31, and 120-41. Furthermore, the variable amplifiers 112-1 to 112-4 respectively output the second differential signals to the antenna feed lines 130-12, 130-22, 130-32, and 130-42 via the branch units 120-12, 120-22, 120-32, and 120-42. In this way, each of the variable phase amplifiers 110-1 to 110-4 controls the phase and the amplitude of the wireless signal and outputs the two differential signals of which the phases are opposite to each other to the wireless signal.

Furthermore, in a case where the antenna elements 140-1 and 140-2 are to be calibrated, the variable phase shifters 111-1 and 111-2 and the variable amplifiers 112-1 and 112-2 operate as follows, for example.

For example, the variable amplifier 112-1 confirms that the antenna element 140-1 is a calibration target in accordance with the instruction signal output from the phase amplitude controller 100. Then, the variable amplifier 112-1 outputs a first signal for calibration (or first calibration signal, hereinafter, may be referred to as "first signal") to the antenna feed line 130-11 via the branch unit 120-11 without outputting a signal to the antenna feed line 130-12 via the branch unit 120-12. Furthermore, the variable amplifier 112-2 also confirms that the antenna element 140-2 is a calibration target in accordance with the instruction signal output from the phase amplitude controller 100. Then, the variable amplifier 112-2 outputs a second signal for calibration (or second calibration signal, hereinafter, may be referred to as "second signal") to the antenna feed line 130-22 via the branch unit 120-22 without outputting a signal to the antenna feed line 130-21 via the branch unit 120-21. When the calibration is performed between the antenna elements 140-1 and 140-2, the phase comparator 155-1 detects (or measures) a phase difference. Therefore, the variable phase amplifiers 110-1 and 110-2 respectively output the first and second signals for calibration to the antenna feed lines 130-11 and 130-22 on the side that is not directly connected to the phase comparator 155-1 (outer side).

The branch units 120-11, 120-12, . . . , 120-41, and 120-42 respectively output the differential signals and the first and the second signals output from the variable phase amplifiers 110-1 to 110-4 to the antenna feed lines 130-11, 130-12, . . . , 130-41, and 130-42.

Furthermore, the branch units 120-11, 120-12, . . . , 120-41, and 120-42 output a first and a second reflected signals that are obtained by reflecting the first and the second signals by the antenna elements 140-1 to 140-4 to the phase comparator 155-1. For example, when the calibration is performed between the antenna elements 140-1 and 140-2, the branch units 120-12 and 120-21 respectively output the first and the second reflected signals received from the antenna feed lines 130-12 and 130-21 to the phase comparator 155-1.

Note that each of the branch units 120-11, 120-12, . . . , 120-41, and 120-42 may be, for example, a switch, a coupler, a circulator, or the like.

The antenna feed lines 130-11, 130-21, . . . , 130-41, and 130-42 respectively output the first and the second differential signals (or wireless signals) output from the branch units 120-11, 120-12, . . . , 120-41, and 120-42 to the antenna elements 140-1 to 140-4.

Furthermore, the antenna feed lines 130-11, 130-21, . . . , 130-41, and 130-42 respectively output the first and the second reflected signals to the branch units 120-11, 120-12, . . . , 120-41, and 120-42.

The antenna elements 140-1 to 140-4 transmit the wireless signals to, for example, the terminal device. Each of the antenna elements 140-1 to 140-4 may be, for example, a planar antenna such as a patch antenna. For example, a radiation element (or antenna elements 140-1 to 140-4) is provided on a top surface of a dielectric substrate, and a lower surface is a ground conductor plate. Each of the antenna elements 140-1 to 140-4 has, for example, a rectangular shape (or square). A length of one side is $\lambda/2$ when it is assumed that a wavelength of a radio wave radiated from the antenna elements 140-1 to 140-4 is $\lambda$. Therefore, the rectangular element serves as a resonator and can operate as an antenna element. Furthermore, for example, power according to the differential signals is supplied from two power supply points to the antenna elements 140-1 to 140-4, and the antenna elements 140-1 to 140-4 transmit the wireless signal (differential signal) as a wireless radio wave.

Furthermore, when the calibration is performed between the antenna elements 140-1 and 140-2, the antenna elements 140-1 and 140-2 operate as follows, for example. For example, to the antenna elements 140-1 and 140-2, the first and the second signals are respectively input from the antenna feed lines 130-11 and 130-22. Then, the antenna elements 140-1 and 140-2 respectively output the first and the second reflected signals to the antenna feed lines 130-12 and 130-21. This is because, for example, the antenna elements 140-1 and 140-2 receive the first and the second signals from one of the antenna feed lines 130-11 and 130-22 and do not receive the signals from another antenna feed lines 130-12 and 130-21, and a potential difference is generated.

For example, when the calibration is performed between the antenna elements 140-2 and 140-3, the first and the second signals are respectively input from the antenna feed lines 130-21 and 130-32 to the antenna elements 140-2 and 140-3. Then, the antenna elements 140-2 and 140-3 respectively output the first and the second reflected signals to the antenna feed lines 130-22 and 130-31.

The phase comparators 155-1 to 155-4 detect the phase differences between the antenna elements 140-1 to 140-4 on the basis of the first and the second reflected signals.

For example, when the calibration is performed between the antenna elements 140-1 and 140-2, the phase comparator 155-1 detects the phase difference between the antenna elements 140-1 and 140-2 on the basis of the first and the second reflected signals respectively received from the branch units 120-12 and 120-21. Furthermore, when the calibration is performed between the antenna elements 140-2 and 140-3, the phase comparator 155-2 detects the phase difference between the antenna elements 140-2 and 140-3 on the basis of the first and the second reflected signals respectively received from the branch units 120-22 and 120-31.

The phase comparators 155-1 to 155-4 respectively output the phase difference detection results (or measurement result) to the ADCs 160-1 to 160-4.

The phase comparators 155-1 to 155-4 respectively include phase comparison circuits 154-1 to 154-4. Here, the phase comparison circuit 154-1 will be described as a representative.

The phase comparison circuit 154-1 detects, for example, the phase difference between the first and the second reflected signals by multiplying the first and the second reflected signals respectively output from the branch units 120-12 and 120-21 or performing an exclusive OR operation and outputs the detected phase difference.

Returning to FIG. 1A, the ADCs 160-1 to 160-3 convert the phase difference detection results into digital signals and output the digital signals to the inter-element calibrator 180.

The oscillator 170 outputs, for example, a local signal in a local frequency band (or oscillation signal, hereinafter, may be referred to as "oscillation signal") to each of the variable phase amplifiers 110-1 to 110-4. When the calibration is performed by the antenna device 10, the oscillation signal is input to each of the variable phase amplifiers 110-1 to 110-4 and is used as a calibration signal (or first and second signals).

The inter-element calibrator 180 controls, for example, a calibration operation of the antenna device 10. The inter-element calibrator 180 includes a selection circuit 181, an arithmetic circuit 182, and a memory 183.

The selection circuit 181 selects any one of the phase difference detection results output from the ADCs 160-1 to 160-3 and outputs the selected detection result to the arithmetic circuit 182. The selection circuit 181 may select all or a part of the phase difference detection results (hereinafter, may be referred to as "phase difference").

The arithmetic circuit 182 outputs the phase differences between each of the antenna elements 140-1 to 140-4 to the system controller 190.

Furthermore, the arithmetic circuit 182 determines an order of detecting the phase differences between each of the antenna elements 140-1 to 140-4. The arithmetic circuit 182 outputs the information regarding the order to the phase amplitude controller 100 as an instruction signal. The arithmetic circuit 182 determines an order of the calibration by using the memory 183 when executing processing.

The system controller 190 controls, for example, the entire antenna device 10. The system controller 190 includes an Input and Output (TO) 191, a Central Processing Unit (CPU) 192, and a memory 193.

The IO 191 receives input of the phase differences between each of the antenna elements 140-1 to 140-4 from the inter-element calibrator 180 and outputs the input phase difference to the CPU 192. Furthermore, the IO 191 outputs control information received from the CPU 192 to the inter-element calibrator 180. Moreover, the IO 191 outputs an instruction signal received from the CPU 192 to the phase amplitude controller 100.

The CPU 192 determines an adjustment value based on the phase differences between each of the antenna elements 140-1 to 140-4. Then, the CPU 192 adds (or subtracts) the adjustment value to (or from) the phase to be applied to each of the antenna elements 140-1 to 140-4 at the time of beamforming. With this operation, for example, the phase that has been calibrated, and in addition, has been adjusted for beamforming can be calculated. The CPU 192 generates an instruction signal including the phase to which the adjustment value has been added and outputs the generated instruction signal to the phase amplitude controller 100 via the IO 191. The phase amplitude controller 100 outputs the adjusted phase to each of the variable phase amplifiers 110-1 to 110-4 as an instruction signal in accordance with the instruction signal. With this operation, the calibration (or calibration) between the antenna elements 140-1 to 140-4 can be performed.

The memory 193 is used, for example, when the CPU 192 executes processing, and a value or the like is written to or read from the memory 193.

Figure 1B:
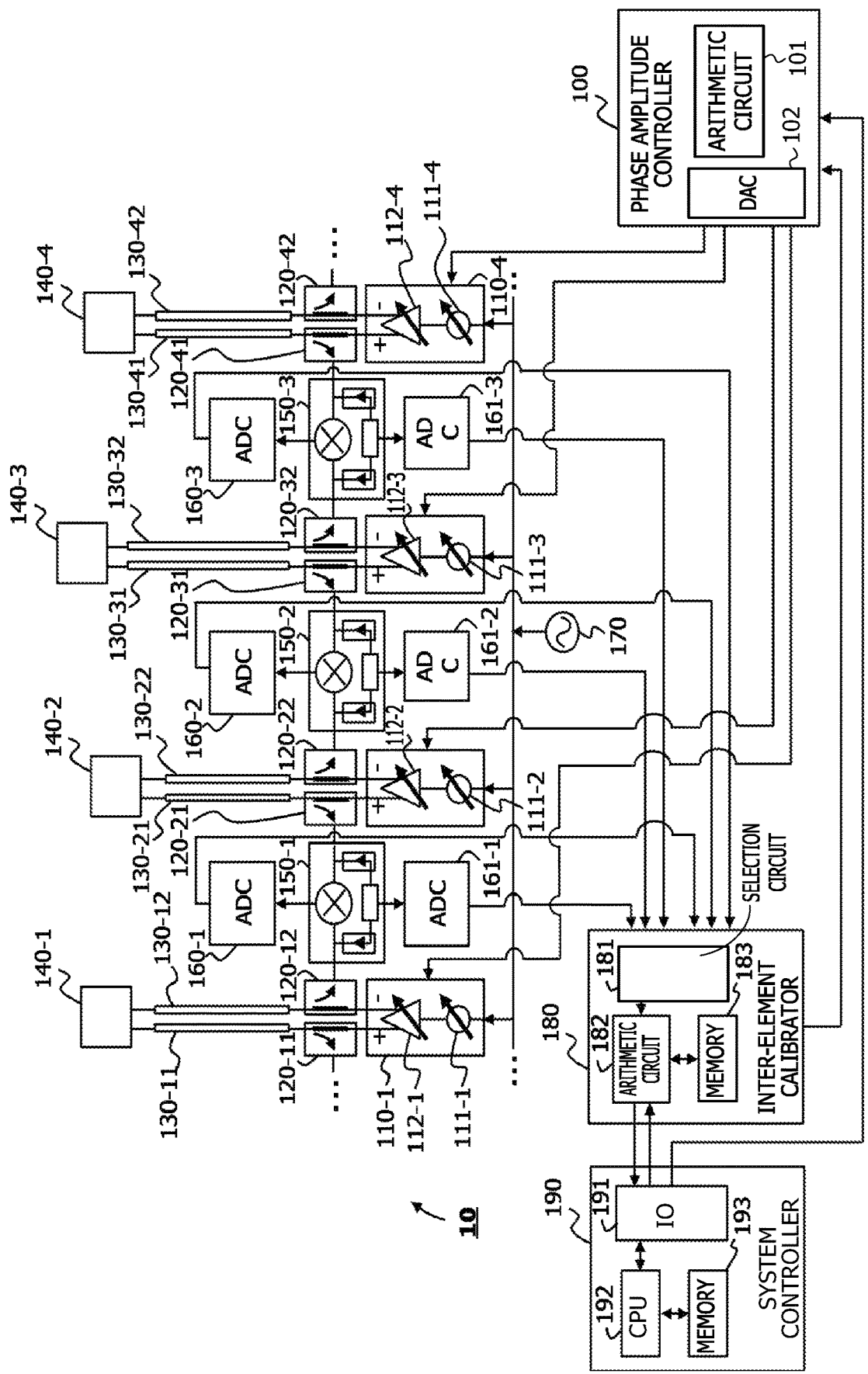
FIG. 1B is a diagram illustrating an exemplary configuration of the antenna device.

FIG. 1B is a diagram illustrating an exemplary configuration of the antenna device 10 in a case where phase amplitude comparators 150-1 to 150-3 are provided instead of the phase comparators 155-1 to 155-3 illustrated in FIG. 1A. The antenna device 10 illustrated in FIG. 1B further includes ADCs 161-1 to 161-3.

The phase amplitude comparators 150-1 to 150-3 detect phase differences and amplitude differences between the antenna elements 140-1 to 140-4 on the basis of the first and the second reflected signals.

Figure 3:
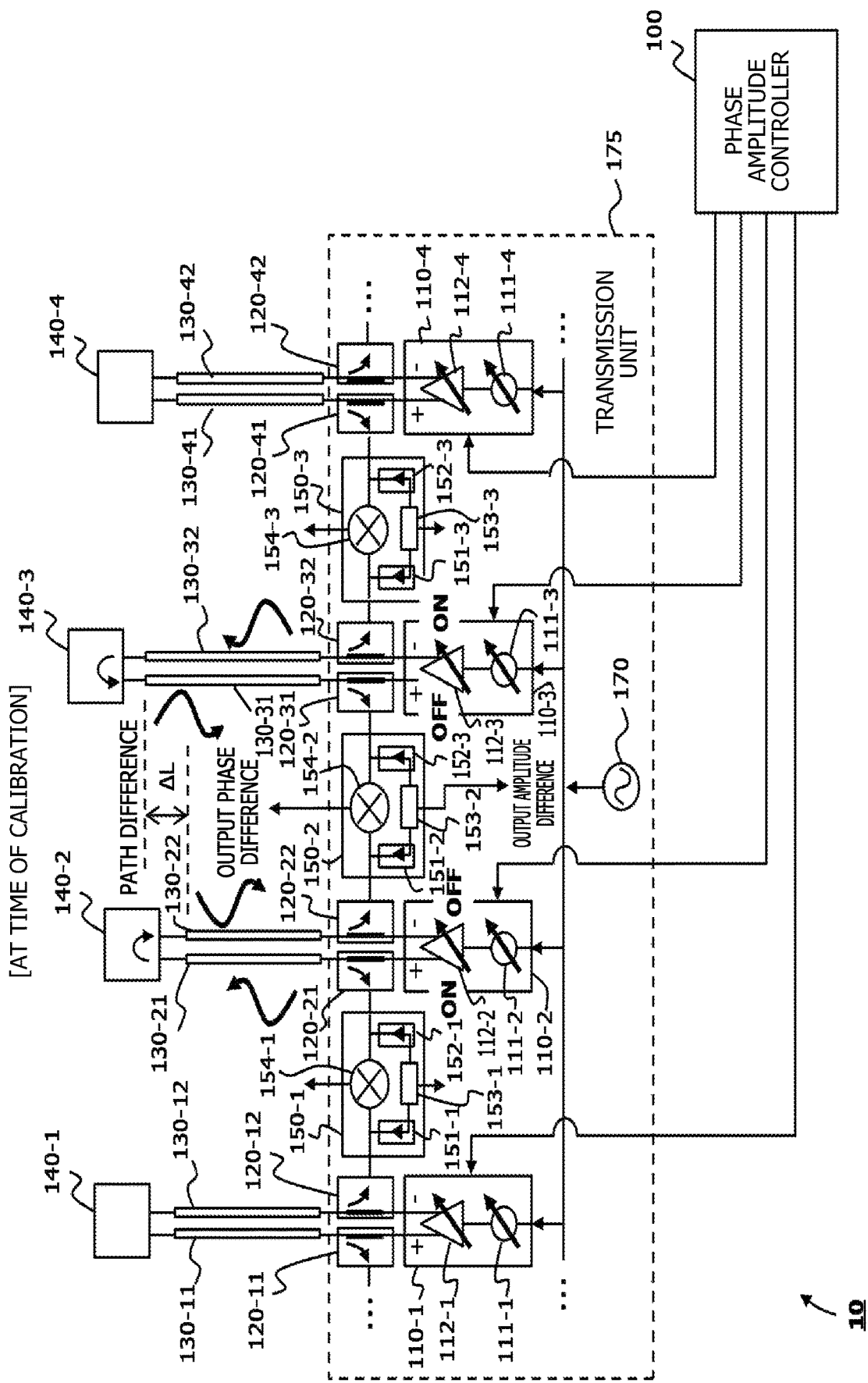
FIG. 3 is a diagram illustrating an example of an operation at the time of calibration.

FIG. 3 illustrates an exemplary configuration of the antenna device 10 as in FIG. 1B. Here, an exemplary configuration of the phase amplitude comparators 150-1 to 150-4 will be described with reference to FIG. 3. The phase amplitude comparator 150-1 will be described as a representative. The phase amplitude comparator 150-1 includes power detectors (or diodes) 151-1 and 152-1, an amplitude output unit 153-1, and the phase comparison circuit 154-1.

The power detector 151-1 detects an amplitude of the first reflected signal output from the branch unit 120-12 and outputs the detected amplitude to the amplitude output unit 153-1. Furthermore, the power detector 152-1 detects an amplitude of the second reflected signal output from the branch unit 120-21 and outputs the detected amplitude to the amplitude output unit 153-1.

The amplitude output unit 153-1 detects an amplitude difference between the amplitude of the first reflected signal and the amplitude of the second reflected signal and outputs a detection result of the detected amplitude difference. In this case, the amplitude output unit 153-1 may output the amplitudes of the first and the second reflected signals as it is without detecting the amplitude difference.

Each of the ADCs 161-1 to 161-3 converts the detection result of the amplitude difference into a digital signal and outputs the digital signal to the inter-element calibrator 180.

The selection circuit 181 of the inter-element calibrator 180 selects one of the detection results of the amplitude differences (hereinafter, may be referred to as "amplitude difference") output from the ADCs 161-1 to 161-3 and outputs the selected amplitude difference to the arithmetic circuit 182. In this case, the selection circuit 181 may select and output all or a part of the amplitude differences output from the ADCs 161-1 to 161-3. As in FIG. 1A, since the selection circuit 181 inputs the phase differences output from the ADCs 160-1 to 160-3, the selection circuit 181 selects the detection result of the phase difference and also selects the detection result of the amplitude difference.

The arithmetic circuit 182 outputs the amplitude differences and the phase differences between each of the antenna elements 140-1 to 140-4 to the system controller 190.

The IO 191 of the system controller 190 outputs the phase differences and the amplitude differences between each of the antenna elements to the CPU 192. The CPU 192 determines the adjustment value based on the phase differences and the amplitude differences between each of the antenna elements 140-1 to 140-4 on the basis of the phase difference and the amplitude differences between the antenna elements 140-1 to 140-4. The CPU 192 adds (or subtract) the adjustment value to (or from) the phase and the amplitude to be applied to each of the antenna elements 140-1 to 140-4 at the time of beamforming. With this operation, it is possible to calculate the phase and the amplitude adjusted for beamforming. The CPU 192 generates an instruction signal including the phase and the amplitude to which the adjustment value is added and outputs the instruction signal to the phase amplitude controller 100 via the IO 191.

The phase amplitude controller 100 outputs the adjusted phase and amplitude to each of the variable phase amplifiers 110-1 to 110-4 as an instruction signal in accordance with the instruction signal. With this operation, the calibration between the antenna elements 140-1 to 140-4 can be performed.

In the above, the exemplary configuration of the antenna device 10 has been described with reference to FIGS. 1A and 1B.

For example, in a case where the amplitude difference can be ignored, it is possible to operate the antenna device 10 by using the phase comparators 155-1 to 155-3 as illustrated in FIG. 1A instead of the phase amplitude comparators 150-1 to 150-3 illustrated in FIG. 1B.

Furthermore, in a case where the phase comparators 155-1 to 155-3 illustrated in FIG. 1A are used, and the amplitude is controlled without performing the calibration, the system controller 190 can output an instruction signal for instructing to perform such amplitude control to the phase amplitude controller 100.

In the examples in FIGS. 1A and 1B, an example in which the four antenna elements 140-1 to 140-4 and the four variable phase amplifiers 110-1 to 110-4 are provided has been described. For example, the number of antenna elements 140-1 to 140-4 may be two or three, or may be equal to or more than five. Furthermore, in the examples in FIGS. 1A and 1B, an example in which the three phase comparators 155-1 to 155-3 and the three phase amplitude comparators 150-1 to 150-3 are provided has been described. However, the number of the above devices may be one or two or equal to or more than four depending on the number of antenna elements 140-1 to 140-4 and the number of variable phase amplifiers 110-1 to 110-4.

Note that, in the following description, description will be made with reference to the drawing (FIG. 1B) using the phase amplitude comparators 150-1 to 150-3. However, the phase comparators 155-1 to 155-3 illustrated in FIG. 1A may be used instead of the phase amplitude comparators 150-1 to 150-3.

<Operation Example>

First, an example of an operation of the antenna device 10 at the normal time (or at the time of beamforming) will be described. Next, an operation of the antenna device 10 at the time of the calibration will be described.

<1. Operation Example at Normal Time>

Figure 2:
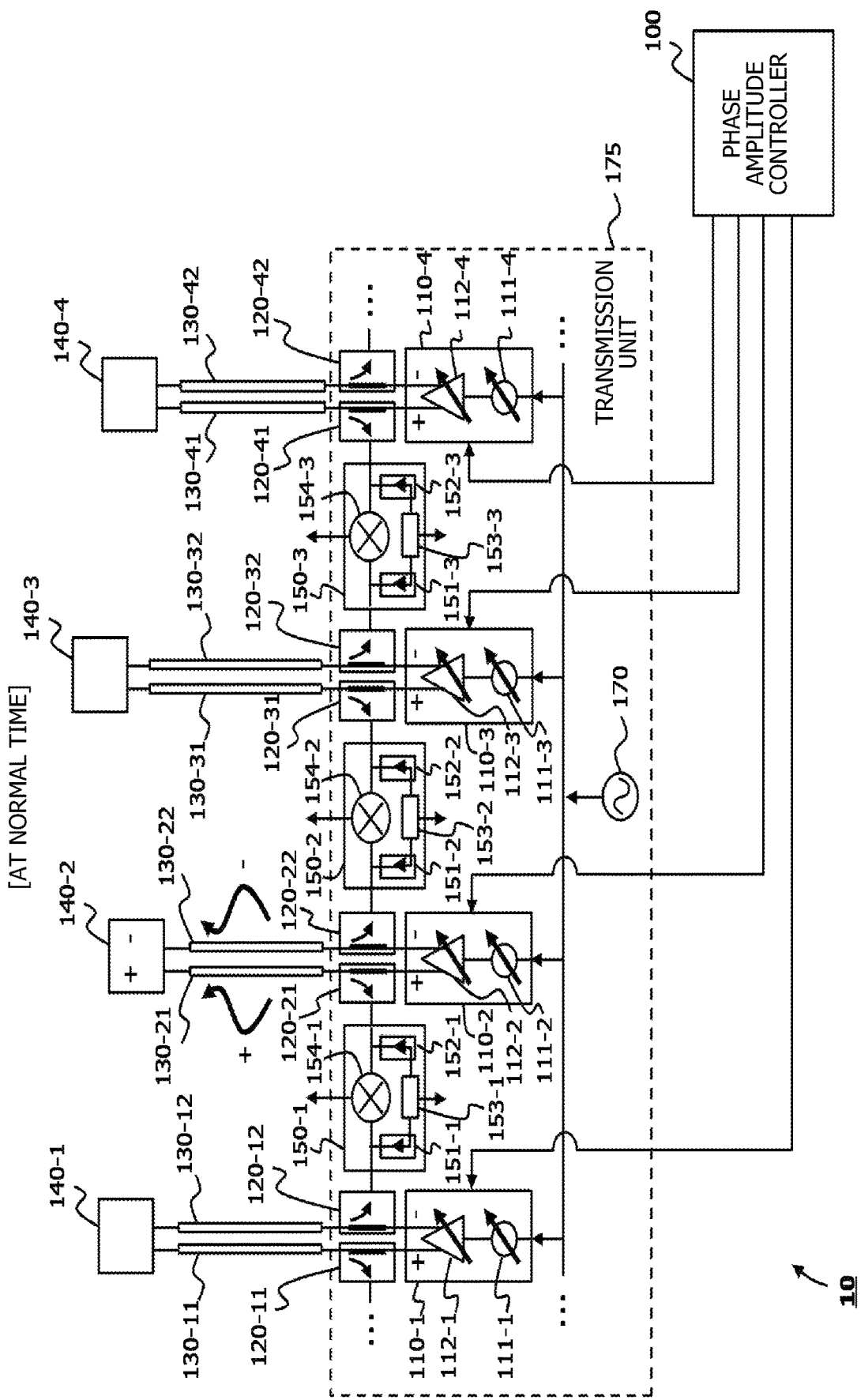
FIG. 2 is a diagram illustrating an example of an operation at a normal time.

FIG. 2 is a diagram illustrating an example of an operation at a normal time. However, in FIG. 2, the inter-element calibrator 180 and the system controller 190 are omitted.

Note that the antenna device 10 includes a transmission unit 175, and the transmission unit 175 includes the variable phase amplifiers 110-1 to 110-4, the branch units 120-11, 120-12, . . . , 120-41, and 120-42, the phase amplitude comparators 150-1 to 150-4, and the oscillator 170.

As illustrated in FIG. 2, the phase amplitude controller 100 outputs an instruction signal for setting the phase and the amplitude of the wireless signal output from the antenna element 140-2 to certain values to the variable phase amplifier 110-2.

The variable amplifier 112-1 of the variable phase amplifier 110-2 controls the phase of the input wireless signal to an instructed phase (or shift phase) according to the instruction signal. Furthermore, the variable amplifier 112-2 controls the amplitude of the wireless signal to an instructed amplitude (or change amplitude) according to the instruction signal. Moreover, the variable amplifier 112-2 generates two differential signals (for example, first and second differential signals) of which the phases are opposite to each other with respect to the wireless signal of which the phase and the amplitude are controlled. Then, the variable amplifier 112-2 outputs the first differential signal to the antenna feed line 130-21 and outputs the second differential signal to the antenna feed line 130-22. The two differential signals are applied to the antenna element 140-2, and the wireless signal is transmitted from the antenna element 140-2. Note that it is assumed that, for example, the wireless signal is input to the variable phase shifter 111-2 of the variable phase amplifier 110-2.

The phase amplitude controller 100 outputs the phase and the amplitude to each of the variable phase amplifiers 110-1, 110-3, and 110-4, the antenna elements 140-1, 140-3, and 140-4 can transmit the wireless signals by beamforming control as in a case of FIG. 2.

<2. Operation Example at the Time of Calibration>

Figure 4:
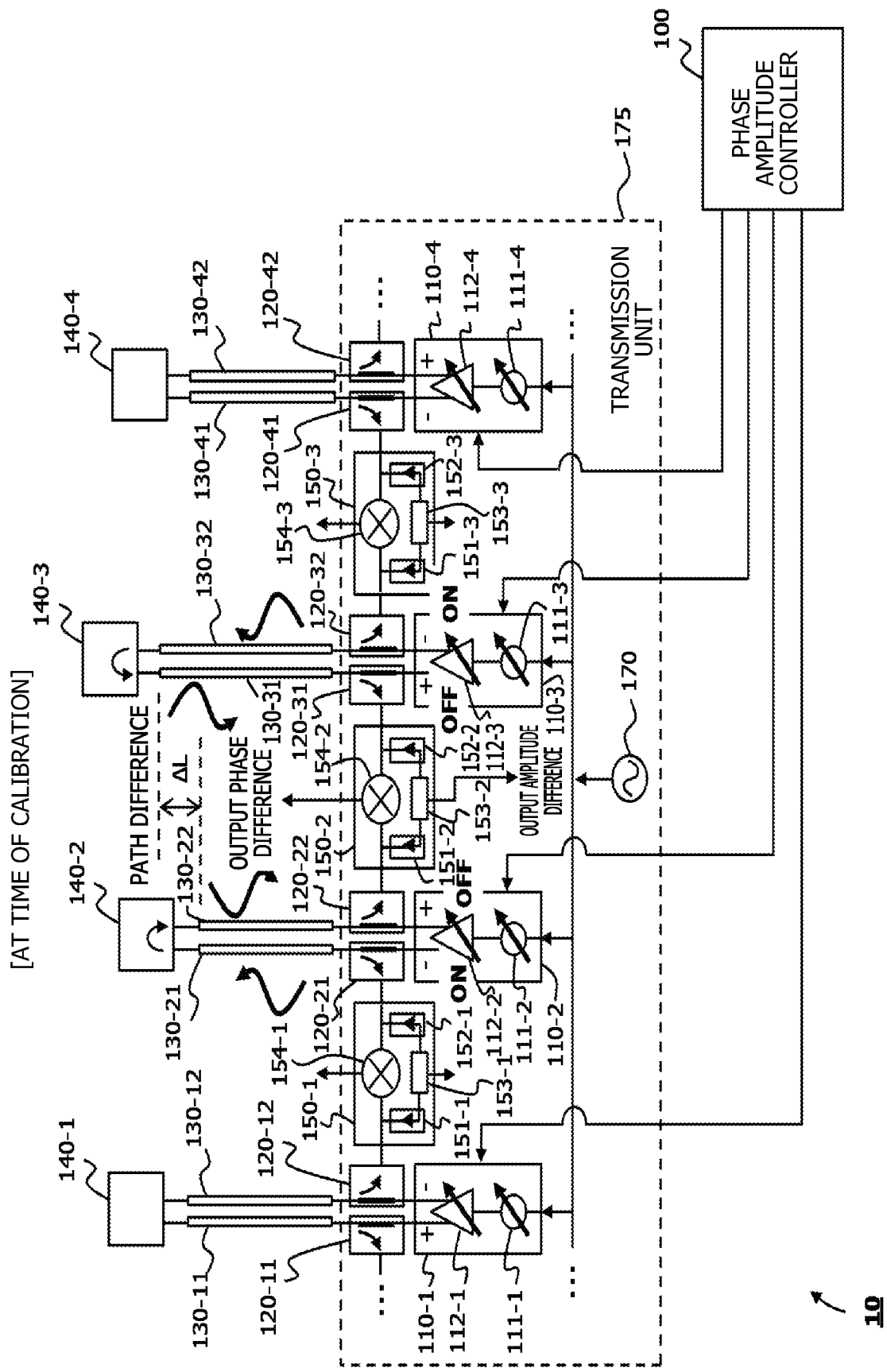
FIG. 4 is a diagram illustrating an example of the operation at the time of the calibration.
Figure 5:
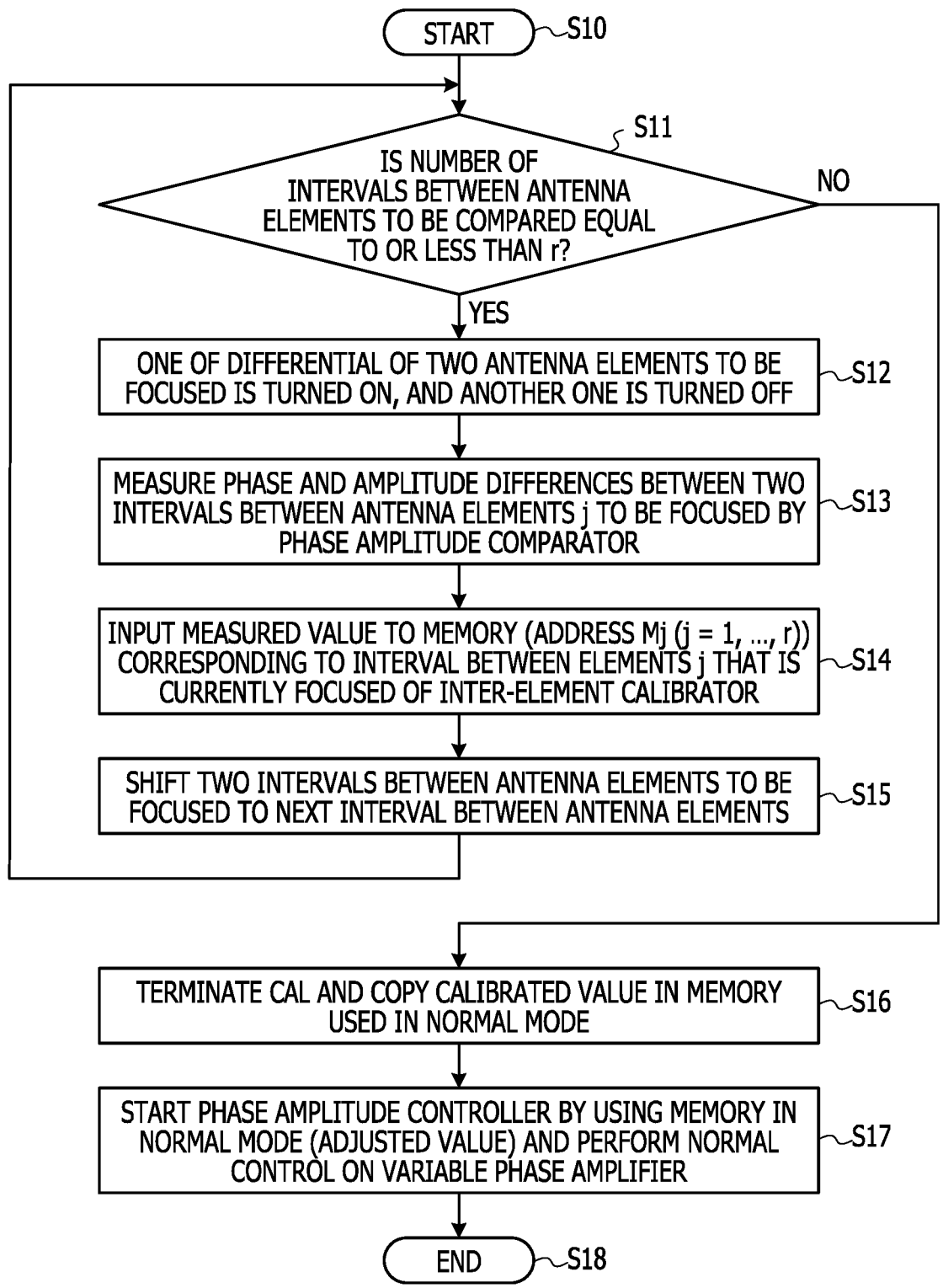
FIG. 5 is a flowchart illustrating an example of an operation.

FIGS. 3 and 4 are diagrams illustrating an example of an operation when the calibration is performed between the antenna elements 140-2 and 140-3. Furthermore, FIG. 5 is a flowchart illustrating an example of the operation of the antenna device 10 when the calibration is performed. As a specific example, the examples in FIGS. 3 and 4 will be described while describing FIG. 5.

A calibration target is a phase difference and an amplitude difference by a path difference (or path difference, hereinafter, may be referred to as "path difference") ΔL between the antenna elements 140-2 and 140-3 in the example in FIG. 3. For example, the antenna device 10 calibrates the phase difference and the amplitude difference by the path difference ΔL between a path from the branch units 120-21 and 120-22 to the antenna element 140-2 and a path from the branch units 120-31 and 120-32 to the antenna element 140-3.

Note that, in the following description, the antenna feed lines 130-11, 130-21, . . . , 130-41, and 130-42 may be referred to as an antenna feed line 130. Furthermore, the antenna elements 140-1 to 140-4 may be referred to as an antenna element 140. Moreover, the phase amplitude comparators 150-1 to 150-3 may be referred to as a phase amplitude comparator 150.

As illustrated in FIG. 5, when starting processing (S10), the antenna device 10 determines whether or not the number of intervals between the antenna elements j that is currently focused is equal to or more than r (S11). The reference r represents the number of intervals between the antenna elements in the entire antenna device 10. For example, it is assumed that the number of intervals between the antenna elements that is currently focused is j (j r). Each time when processing in S15 ends in order from j=1, the arithmetic circuit 182 of the inter-element calibrator 180 increments j and determines whether or not j is equal to or less than r. In the example in FIG. 3, when it is assumed that r=3, j=1 between the antenna elements 140-1 and 140-2, and j=2 between the antenna elements 140-2 and 140-3, the arithmetic circuit 182 determines that j is equal to or less than r in the state of FIG. 3.

Returning to FIG. 5, when the number of intervals between the antenna elements j is equal to or less than r (Yes in S11), the antenna device 10 turns on one of the antenna feed lines 130 of the two antenna elements 140 that are focused and turns off another one (S12). For example, in the example in FIG. 3, the antenna device 10 executes the following processing.

For example, the inter-element calibrator 180 outputs an instruction signal of which the processing target is between the antenna elements 140-2 and 140-3 to the phase amplitude controller 100. Upon receiving the instruction signal, the phase amplitude controller 100 outputs an instruction signal for turning on the antenna feed line 130-21 and turning off the antenna feed line 130-22 to the variable phase amplifier 110-2. Furthermore, upon receiving the instruction signal, the phase amplitude controller 100 outputs an instruction signal for turning on the antenna feed line 130-32 and turning off the antenna feed line 130-31 to the variable phase amplifier 110-3. Upon receiving the instruction signals, the variable phase amplifiers 110-2 and 110-3 respectively output the first and the second signals to the antenna feed lines 130-21 and 130-32 without outputting the signal to the antenna feed lines 130-22 and 130-31.

Returning to FIG. 5, next, the antenna device 10 measures (or detects) the phase difference and the amplitude difference of the two intervals between the antenna elements j to be focused by the phase amplitude comparator 150 (S13). For example, in the example in FIG. 3, the antenna device 10 executes the following processing.

For example, the phase amplitude comparator 150-2 acquires the first and the second reflected signals respectively from the antenna feed lines 130-22 and 130-31 via the branch units 120-22 and 120-31. Then, the phase amplitude comparator 150-2 detects the phase difference and the amplitude difference between the antenna elements 140-2 and 140-3 on the basis of the first and the second reflected signals.

Note that, in the example in FIG. 3, the "ON" side of the variable amplifier 112-2 is "+", the "ON" side of the variable amplifier 112-3 is "−", and the phase amplitude comparator 150-2 acquires the first and the second reflected signals of which the phases are opposite to each other. Therefore, in the example in FIG. 3, the phase amplitude comparator 150-2 may detect the phase difference and the amplitude difference after executing processing for making the first and the second reflected signals have the in-phase relationship by inversing the phase of the second reflected signal or inversing the phase of the first reflected signal.

FIG. 4 is a diagram illustrating an exemplary configuration of the antenna device 10 in a case where a relationship between "+" and "−" of the two variable amplifiers 112-2 and 112-4 (or in-phase or anti-phase relationship) is reversed from that in FIG. 3. In the example in FIG. 4, regarding the phase amplitude comparators 150-1 to 150-3, the two reflected signals to be input have the in-phase relationship. Therefore, when detecting the phase difference, the phase amplitude comparators 150-1 to 150-3 can detect the phase difference without reversing the phases of the first and the second reflected signals.

Returning to FIG. 5, next, the antenna device 10 inputs (or store) the detected value in the memory 183 of the inter-element calibrator 180 corresponding to the interval between the antenna elements j that is currently focused (S14). For example, in the example in FIG. 3, the antenna device 10 executes the following processing.

For example, the phase amplitude comparator 150-2 outputs the detected phase difference and amplitude difference to the inter-element calibrator 180 via the respective ADCs 160-2 and 160-2. The arithmetic circuit 182 of the inter-element calibrator 180 receives the detected phase difference and amplitude difference via the selection circuit 181 and stores the received differences in the memory 183. At this time, the arithmetic circuit 182 stores the detected phase difference and amplitude difference in an address Mj (M2 in a case where interval between antenna elements j=2) of the memory 183.

Returning to FIG. 5, next, the antenna device 10 shifts the two intervals between the antenna elements j to be focused to a next interval between the antenna elements (j+1) (S15). For example, in the example in FIG. 3, the arithmetic circuit 182 of the inter-element calibrator 180 increments the intervals between the antenna elements j=2 to j=3 and sets a calibration target to an interval between the antenna elements 140-3 and 140-4.

Then, until the interval between the antenna elements j to be focused becomes r, the antenna device 10 repeats the processing from S11 to S15 (loop of Yes in S11).

When the number of intervals between the antenna elements j to be focused reaches r (No in S11), the antenna device 10 ends the calibration and copies the calibrated value in a memory that is used in a normal mode (S16). For example, in the example in FIG. 3, the antenna device 10 executes the following processing.

For example, when the interval between the antenna elements j reaches r, the memory 183 of the inter-element calibrator 180 stores the phase difference and the amplitude difference of the interval between the antenna elements j=1 in an address M1, and stores the phase difference and the amplitude difference of the interval between the antenna elements j=2 in an address M2. Each address Mj stores the phase difference and the amplitude difference of each interval between the antenna elements j. The arithmetic circuit 182 reads the phase difference and the amplitude difference of each interval between the antenna elements j from each address Mj of the memory 183 and outputs the read differences to the system controller 190. Upon receiving the phase difference and the amplitude difference of each interval between the antenna elements j via the IO 191, the CPU 192 of the system controller 190 stores the received differences in the memory 193.

Returning to FIG. 5, next, the antenna device 10 starts processing in the phase amplitude controller 100 by using a memory for the normal mode (adjusted value) and performs normal control on the variable phase amplifier 110 (S17). For example, in the example in FIG. 3, the antenna device 10 executes the following processing.

For example, the CPU 192 of the system controller 190 reads the phase difference and the amplitude difference of each interval between the antenna elements j from the memory 193 and calculates adjustment values of the phase difference and the amplitude difference to be applied to each interval between the antenna elements. For example, when the phase difference between the antenna elements 140-2 and 140-3 is "+2°", the CPU 192 calculates "−2°" as the adjustment value of the phase difference. The CPU 192 stores the calculated adjustment value in the memory 193. Then, when performing beamforming, the CPU 192 adds (or subtracts) the adjustment value read from the memory 193 to (or from) the phase difference and the amplitude difference to be applied to each of the antenna elements 140-1 to 140-4 as beamforming. As a result, a phase difference and an amplitude difference for beamforming can be calculated in consideration of the calibrated phase difference and amplitude difference. For example, in a case where a phase difference of "0°" is applied to the antenna element 140-1 and a phase difference of "45°" is applied to the antenna element 140-2 for beamforming, the CPU 192 calculates "0°" for the antenna element 140-1 and "43° (=45°−2°)" for the antenna element 140-2 as the phase differences in consideration of the calibration. The CPU 192 outputs an instruction signal including the phase difference and the amplitude difference for beamforming that are calibrated to the phase amplitude controller 100. The phase amplitude controller 100 outputs an instruction signal including the phase difference and the amplitude difference to each of the variable phase amplifiers 110-1 to 110-4 in accordance with the instruction signal. Each of the variable phase amplifiers 110-1 to 110-4 controls the phase and the amplitude of the wireless signal to be input in accordance with the instruction signal and outputs a differential signal to each of the antenna elements 140-1 to 140-4.

Note that such calculation may be performed by the phase amplitude controller 100. In that case, for example, the calculation is performed as follows. For example, the CPU 192 of the system controller 190 reads the adjustment value from the memory 193 and outputs the read value to the phase amplitude controller 100. Furthermore, the CPU 192 outputs the phase difference and the amplitude difference to be applied to each of the antenna elements 140-1 to 140-4 for beamforming to the phase amplitude controller 100. The arithmetic circuit 101 of the phase amplitude controller 100 adds (or subtracts) an adjustment value to (or from) the phase difference and the amplitude difference for beamforming and calculates the adjusted phase difference and amplitude difference. The arithmetic circuit 101 outputs an instruction signal including the calculated phase difference and amplitude difference to each of the variable phase amplifiers 110-1 to 110-4.

The above is the example of the operation of the antenna device 10.

Note that, regarding the detection of the phase difference (S13), as illustrated in the example in FIG. 3, when the path of the antenna element 140-3 is longer than the path of the antenna element 140-2 by ΔL, the phase amplitude comparator 150-2 detects 2ΔL as a phase difference. Therefore, for example, the arithmetic circuit 182 of the inter-element calibrator 180 calculates a value (=path difference ΔL) that is a half of the phase difference received from each of the ADCs 160-1 to 160-4 as the phase difference between the antenna elements 140-2 and 140-3. It is sufficient for the arithmetic circuit 182 to store the calculated phase difference in the address M2 of the memory 183.

Furthermore, regarding the detection of the phase difference (S13), for example, when the detected phase difference is "360°", there is a case where it is not possible to determine whether the phase difference is "0°" or "360°" ("180°" when considering reciprocation).

Therefore, at the time of the calibration, the variable phase amplifier 110 may output the first signals at two types of frequencies. For example, the oscillator 170 generates a first oscillation signal at a frequency f0 and a second oscillation signal at a frequency f1 and outputs the signals, for example, to the variable phase amplifiers 110-2 and 110-3. The variable phase amplifier 110-2 outputs the first signal at the frequency f0 and the first signal at the frequency f1, and the variable phase amplifier 110-3 outputs the second signal at the frequency f0 and the second signal at the frequency f1. The phase amplitude comparator 150-2 detects a phase difference between the two reflected signals corresponding to the frequency f0 and detects a phase difference between the two reflected signals corresponding to the frequency f1. The phase amplitude comparator 150-2 outputs the two phase differences to the inter-element calibrator 180, and the inter-element calibrator 180 can calculate a difference between the two phase differences and detect a phase difference between the antenna elements 140-2 and 140-3.

For example, the arithmetic circuit 182 of the inter-element calibrator 180 calculates a phase difference $\Delta\theta$ between the antenna elements 140-2 and 140-3 by using the following formula.

$$\Delta\theta = X \cdot (f1 - f0) \cdot (2\pi \cdot \Delta L / c) \tag{1}$$

In the formula (1), X represents a multiple of 180°. A phase difference $\Delta\theta 1$ with respect to the two frequencies f0 and f1 is indicated as $\Delta\theta 1 = 2\pi (f1 - f0) \cdot \Delta L / c$. However, the formula (1) is obtained by multiplying this by X. As described above, 2ΔL (for reciprocation) is detected as the path difference, the formula (1) may be, for example, X=2.

For example, the arithmetic circuit 182 calculates the difference between the two phase differences including the phase difference corresponding to the frequency f0 and the phase difference corresponding to the frequency f1 so as to calculate the phase difference $\Delta\theta$. As indicated in the formula (1), the inter-element calibrator 180 calculates the difference between the two phase differences output from the phase amplitude comparator 150-2 and calculates the phase difference $\Delta\theta$ between the two antenna elements 140-2 and 140-3.

As described above, in the first embodiment, the antenna device 10 in which the line to the antenna element 140 is used as a differential line performs calibration, for example, by using the differential line. Therefore, it is possible to accurately detect the phase difference and the amplitude difference by the path difference ΔL of the differential line between the antenna elements. Therefore, the antenna device 10 can improve the accuracy of the calibration in this way in comparison with a case where the phase difference and the amplitude difference between the antenna elements 140-2 and 140-3 are not detected.

Furthermore, as illustrated in the example in FIG. 3, the antenna device 10 calculates the phase difference and the amplitude difference between the antenna elements 140-2 and 140-3 by using the antenna feed lines 130-21, 130-31, and 130-32 that are used to transmit the differential signals at the time of the calibration. Therefore, the antenna device 10 can suppress an increase in the device size without separately providing an antenna for calibration or the like. Moreover, in the antenna device 10, a signal line is not additionally provided to perform the calibration. Therefore, it is possible to suppress the increase in the device size from this point as well.

Second Embodiment

In the example described above, regarding the calibration between the antenna elements 140-1 to 140-4, an example has been described in which the phase difference and the amplitude difference between the antenna elements 140-1 and 140-2 are detected first and the phase difference and the amplitude difference between the antenna elements 140-2 and 140-3 are detected next. In this case, the antenna device 10 sequentially detects the phase differences and the amplitude differences between the antenna elements 140-1 to 140-4. For example, in a case where three or more antenna elements exist, the antenna device 10 may detect the phase differences and the amplitude differences between the antenna elements 140-1 to 140-4 by determining a master and comparing the master with a slave.

For example, in FIG. 1B, first, by setting the antenna element 140-2 as a master and the antenna element 140-3 as a slave, the phase difference and the amplitude difference between the antenna elements 140-2 and 140-3 are detected. Next, the antenna element 140-3 that has been set as the slave is set as the master, and the antenna element 140-4 is set as the slave. Furthermore, with respect to the antenna element 140-2 that is the master, the antenna element 140-1 is set as the slave. Then, a phase difference and an amplitude difference between the antenna element 140-3 that is the master and the antenna element 140-4 that is the slave are detected, and at the same time, a phase difference and an amplitude difference between the antenna element 140-2 that is the master and the antenna element 140-1 that is the slave are detected.

For example, the antenna device 10 executes the following processing. For example, an inter-element calibrator 180 receives the phase difference and the amplitude difference between the antenna elements 140-2 and 140-3 from a phase amplitude comparator 150-2. At this time, the inter-element calibrator 180 generates an instruction signal indicating that the phase difference and the amplitude difference between the antenna elements 140-1 and 140-3 are detected and the phase difference and the amplitude difference between the antenna elements 140-3 and 140-4 are detected. The inter-element calibrator 180 outputs the instruction signal to a phase amplitude controller 100. In response to the instruction signal, the phase amplitude controller 100 outputs an instruction signal indicating that the calibration is performed between the antenna elements 140-1 and 140-2 in accordance with the instruction signal to variable phase amplifiers 110-1 and 110-2. Furthermore, the phase amplitude controller 100 outputs the instruction signal and outputs an instruction signal indicating that the calibration is performed between the antenna elements 140-3 and 140-4 to variable phase amplifiers 110-3 and 110-4. With this operation, the calibration is simultaneously performed between the antenna elements 140-1 and 140-2 and between the antenna elements 140-3 and 140-4.

In the method using the master and the slave, when the phase difference and the amplitude difference are detected once, two antenna elements 140 to be the masters are formed. Therefore, the method using the master and the slave can shorten a detection time than a case where the phase differences and the amplitude differences between the antenna elements 140-1 to 140-4 are sequentially detected.

Third Embodiment

In the example described above, for example, as illustrated in FIG. 3, an example has been described in which the path differences ΔL between the antenna feed lines 130-21 and 130-22 and the antenna feed lines 130-31 and 130-32 are detected. However, in reality, it is possible to further detect a path difference including a portion between chips (between variable phase amplifier 110-2 and branch units 120-21 and 120-22 and between variable phase amplifier 110-3 and branch units 120-31 and 130-32).

Figure 6:
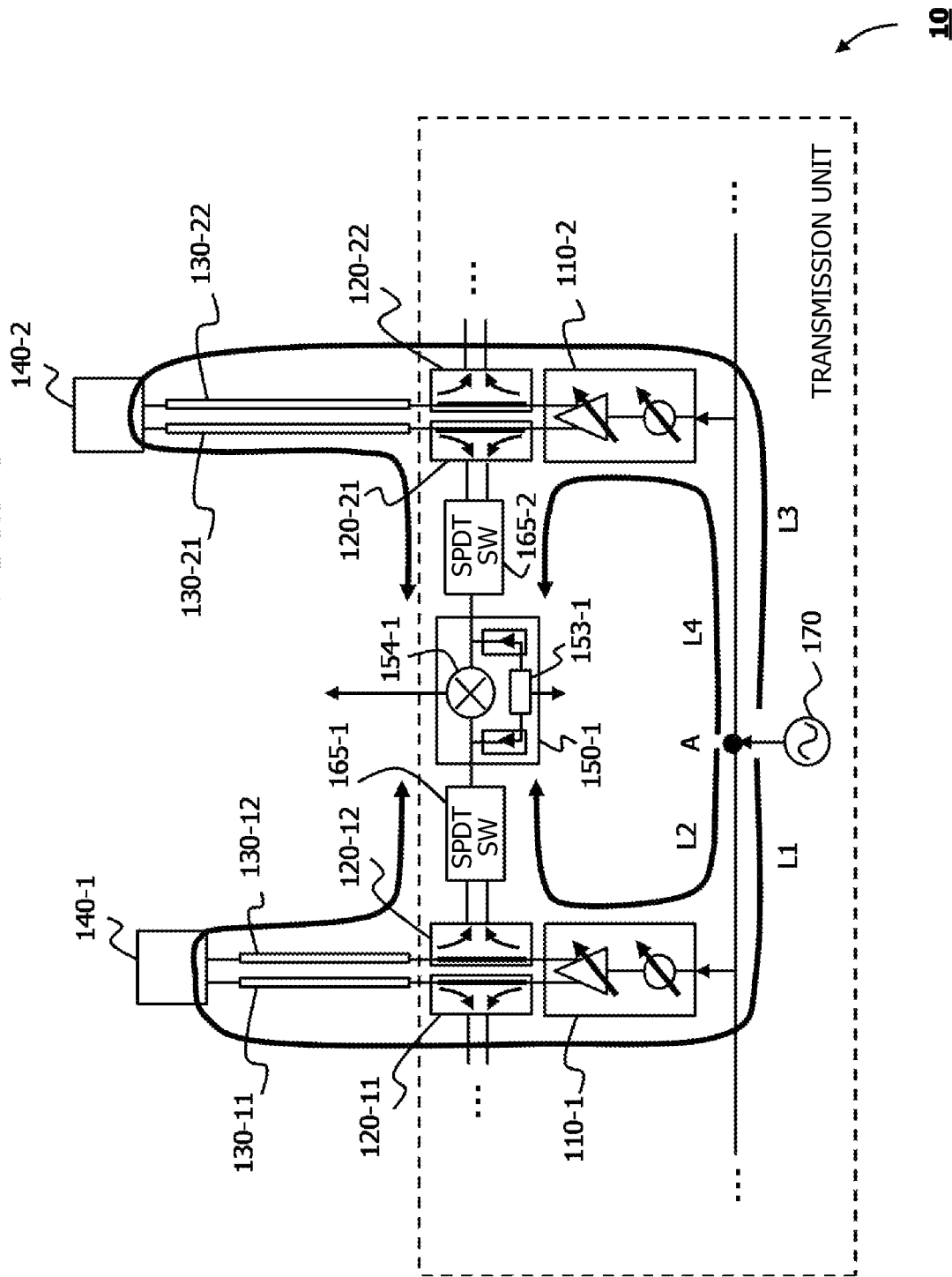
FIG. 6 is a diagram illustrating an example of a path.

FIG. 6 is a diagram illustrating an example of a detectable path difference. As illustrated in FIG. 6, a path L1 is a path from a branch point A of an oscillator 170 to an input end of a phase amplitude comparator 150-1 through a variable phase amplifier 110-1, a branch unit 120-11, an antenna feed lines 130-11 and 130-12, and a branch unit 120-12. Furthermore, a path L3 is a path from the branch point A to the input end of the phase amplitude comparator 150-1 through a variable phase amplifier 110-2, the branch unit 120-22, the antenna feed lines 130-22 and 130-21, and the branch unit 120-21. The phase amplitude comparator 150-1 can detect a phase difference and an amplitude difference due to the path difference between the paths L1 and L3 on the basis of first and the second reflected signals.

Furthermore, as illustrated in FIG. 6, at the branch units 120-12 and 120-21, output signals from the variable phase amplifiers 110-1 and 110-2 are directed to the phase amplitude comparator 150-1. Then, in an antenna device 10, Single Pole Double Throw Switches (SPDT SW) 165-1 and 165-2 are respectively provided between the branch units 120-12 and 120-21 and the phase amplitude comparator 150-1.

At the time of calibration, the SPDT SW 165-1 outputs a calibration signal (or first signal) that is output from an oscillator 170 via the variable phase amplifier 110-1 and the branch unit 120-12 to the phase amplitude comparator 150-1. Furthermore, the SPDT SW 165-2 outputs a calibration signal (or second signal) output from the oscillator 170 via the variable phase amplifier 110-2 and the branch unit 120-21 to the phase amplitude comparator 150-1. A path L2 is a path from the branch point A to the phase amplitude comparator 150-1 via the variable phase amplifier 110-1, the branch unit 120-11, and the SPDT SW 165-1. A path L4 is a path from the branch point A to the input end of the phase amplitude comparator 150-1 via the variable phase amplifier 110-2, the branch unit 120-21, and the SPDT SW 165-2. The phase amplitude comparator 150-1 can detect a path difference between the paths L2 and L4 (or phase difference therebetween) and an amplitude difference on the basis of first and the second signals.

Fourth Embodiment

Moreover, in the example described above, an example of the transmission of the antenna device 10 has been described. The antenna device 10 may operate as not only a transmitter but also a receiver.

Figure 7:
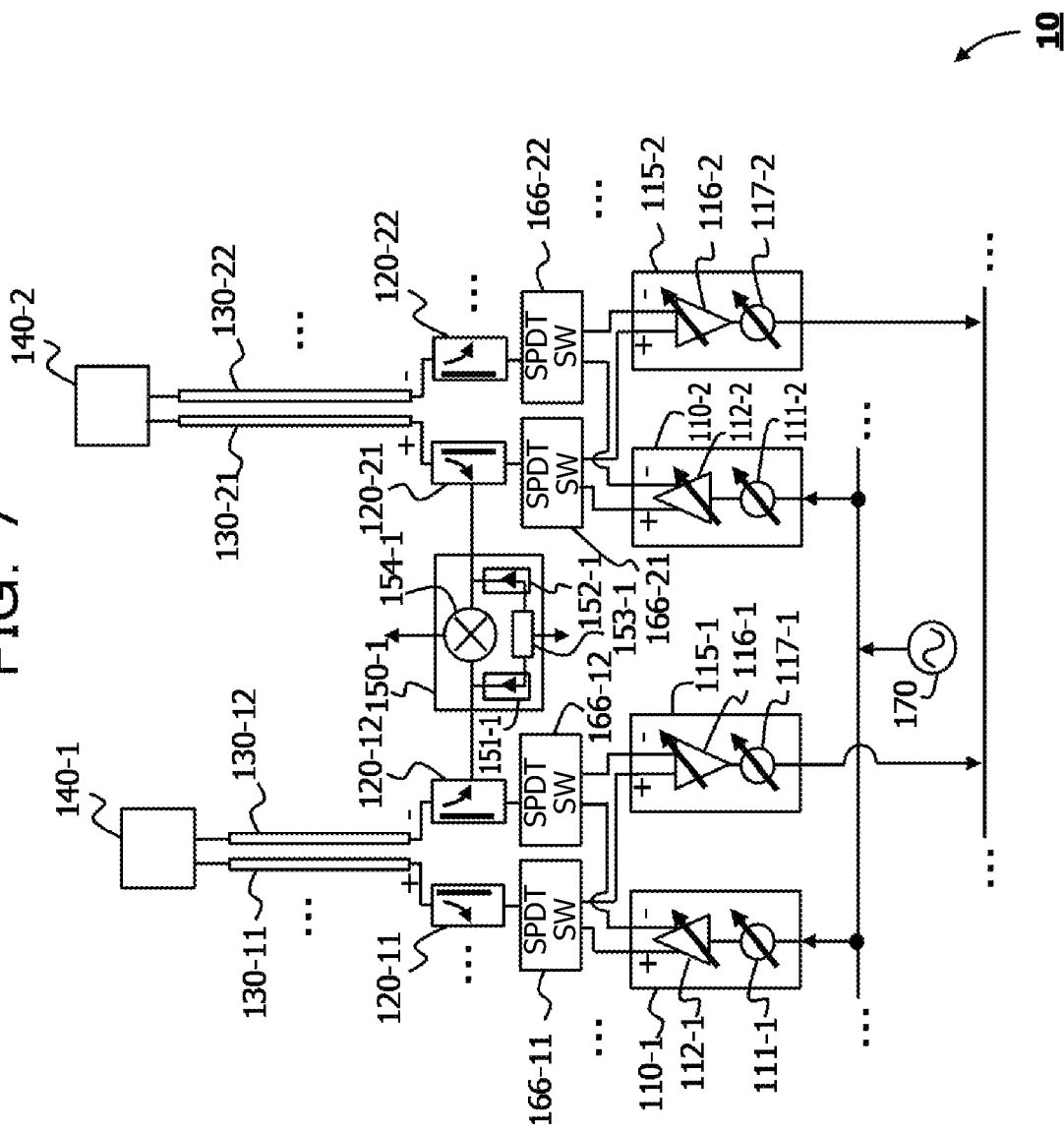
FIG. 7 is a diagram illustrating an exemplary configuration of the antenna device.

FIG. 7 is a diagram illustrating an exemplary configuration in a case where the antenna device 10 has both functions of transmission and reception.

In the example illustrated in FIG. 7, the antenna device 10 further includes variable phase amplifiers 115-1 and 115-2 and SPDT SWs 166-11, 166-12, 166-21, and 166-22.

The variable phase amplifiers 115-1 and 115-2 respectively includes variable amplifiers 116-1 and 116-2 and variable phase shifters 117-1 and 117-2. The variable amplifiers 116-1 and 116-2 control an amplitude of a reception signal (differential signal) according to an instruction signal from a phase amplitude controller 100. Furthermore, the variable phase shifters 117-1 and 117-2 control a phase of the reception signal according to the instruction signal from the phase amplitude controller 100. The variable phase shifters 117-1 and 117-2 output a reception signal of which an amplitude and a phase are controlled to a baseband processing unit, for example, via a frequency converter or the like.

The SPDT SW 166-11 outputs an output signal from the variable phase amplifier 110-1 to the branch unit 120-11 at the time of transmission and calibration and outputs an output signal from the branch unit 120-11 to the variable phase amplifier 115-1 at the time of reception.

Furthermore, the SPDT SW 166-12 outputs an output signal from the variable phase amplifier 110-1 to the branch unit 120-12 at the time of the transmission and the calibration and outputs an output signal from the branch unit 120-12 to the variable phase amplifier 115-1 at the time of the reception.

Moreover, the SPDT SW 166-21 outputs an output signal from the variable phase amplifier 110-2 to the branch unit 120-21 at the time of the transmission and the calibration and outputs an output signal from the branch unit 120-21 to the variable phase amplifier 115-2 at the time of the reception.

Moreover, the SPDT SW 166-22 outputs an output signal from the variable phase amplifier 110-2 to the branch unit 120-22 at the time of the transmission and the calibration and outputs an output signal from the branch unit 120-22 to the variable phase amplifier 115-2 at the time of the reception.

Switching to the SPDT SWs 166-11, 166-12, 166-21, and 166-22 may be performed, for example, by a CPU 192 of a system controller 190. For example, the CPU 192 outputs switching signals to the SPDT SWs 166-11, 166-12, 166-21, and 166-22, and each of the SPDT SWs 166-11, 166-12, 166-21, and 166-22 performs switching in accordance with the switching signal.

At the time of the reception, differential signals (reception signals) having opposite phases flow from an antenna element 140-1 to antenna feed lines 130-11 and 130-12 and are output to the variable phase amplifier 115-1. Furthermore, at the time of the reception, differential signals (reception signals) having opposite phases flow from an antenna element 140-2 to antenna feed lines 130-21 and 130-22 and are output to the variable phase amplifier 115-2.

Fifth Embodiment

Moreover, in the example described above, an example has been described in which the variable phase shifters 111-1 to 111-4 are respectively provided in the variable phase amplifiers 110-1 to 110-4. The variable phase shifters 111-1 to 111-4 may be provided outside the variable phase amplifiers 110-1 to 110-4.

FIGS. 8A to 9B are diagrams illustrating installation examples of the variable phase shifters 111-1 and 111-2.

Figure 8A:
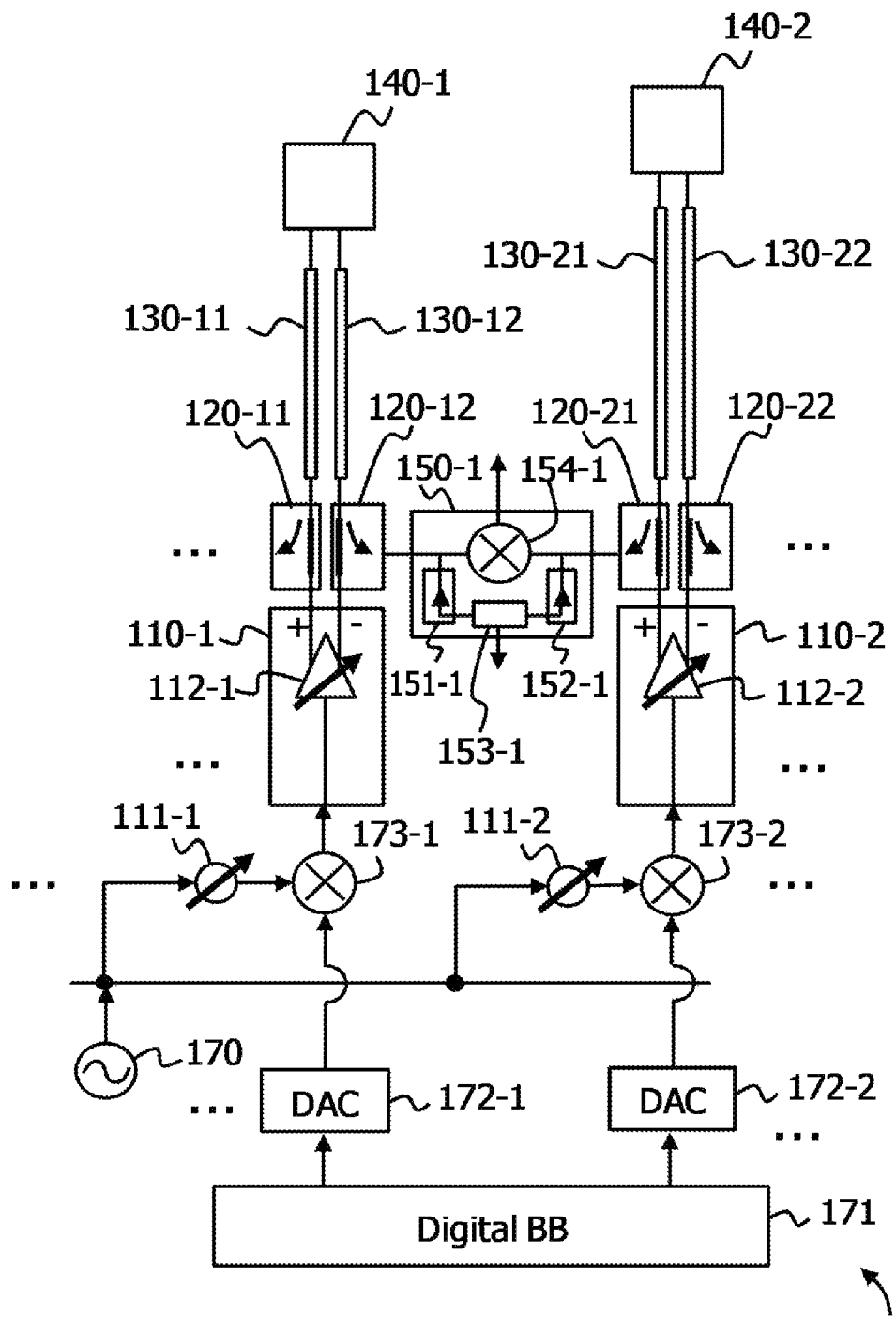
FIGS. 8A and 8B are diagrams illustrating an exemplary configuration of the antenna device.

FIG. 8A illustrates an example in which the variable phase shifters 111-1 and 111-2 are installed on a path through which a local signal output from an oscillator 170 is transmitted. In this case, the variable phase shifters 111-1 and 111-2 control phases in accordance with an instruction signal from a phase amplitude controller 100. An antenna device 10 further includes a digital Base Band (BB) unit 171, Digital to Analogue Converters (DAC) 172-1 and 172-2, and mixers (or frequency converter) 173-1 and 173-2. The mixers 173-1 and 173-2 convert (upconvert), for example, a baseband signal in a baseband band output from the digital BB unit 171 into a wireless signal in an operation frequency band (or wireless frequency band) of antenna elements 140-1 and 140-2 on the basis of an oscillation signal from the oscillator 170. The baseband band is a frequency band lower than the operation frequency band. The mixers 173-1 and 173-2 output the wireless signal of which the frequency has been converted to the variable amplifiers 112-1 and 112-2. In the example in FIG. 8A, at the time of the calibration, the mixers 173-1 and 173-2 output the oscillation signals of which the phase is controlled to the variable amplifiers 112-1 and 112-2 as a signal for calibration. In this case, the signal for calibration is a signal, for example, in the operation frequency band same as the antenna elements 140-1 and 140-2.

Figure 8B:
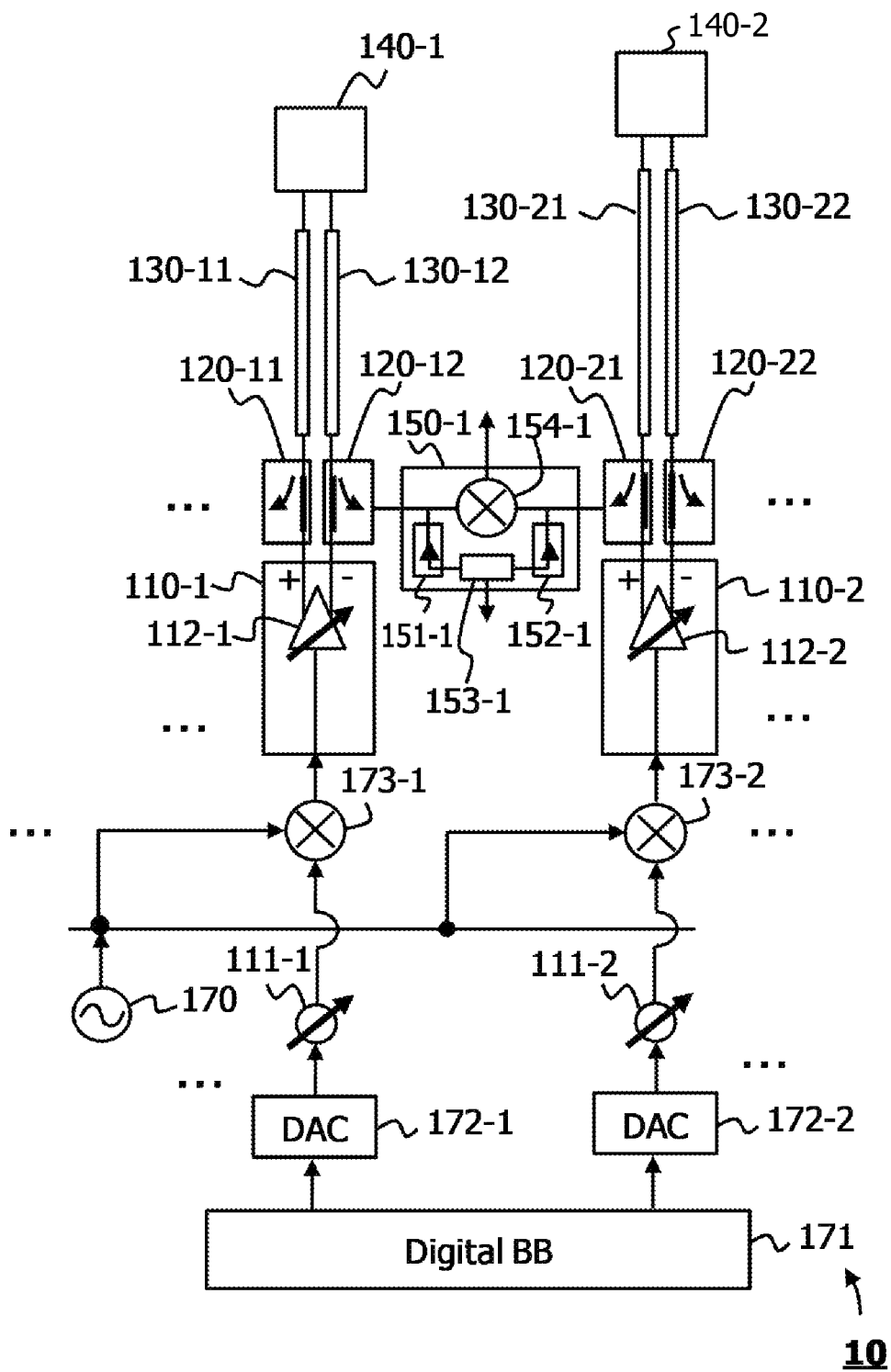

FIG. 8B illustrates an example in which the variable phase shifters 111-1 and 111-2 are installed on a path in the baseband band (or low frequency band). In this case, the variable phase shifters 111-1 and 111-2 control phases of data signals output from the DACs 172-1 and 172-2 in accordance with the instruction signal of the phase amplitude controller 100.

In the example in FIG. 8B, for example, positions of the variable phase shifters 111-1 and 111-2 may be replaced with positions of the variable amplifiers 112-1 and 112-2. For example, the variable phase shifters 111-1 and 111-2 may be respectively provided in the variable phase amplifiers 110-1 and 110-2, and the variable amplifiers 112-1 and 112-2 may be respectively provided at positions of the variable phase shifters 111-1 and 111-2 illustrated in FIG. 8B.

Figure 9A:
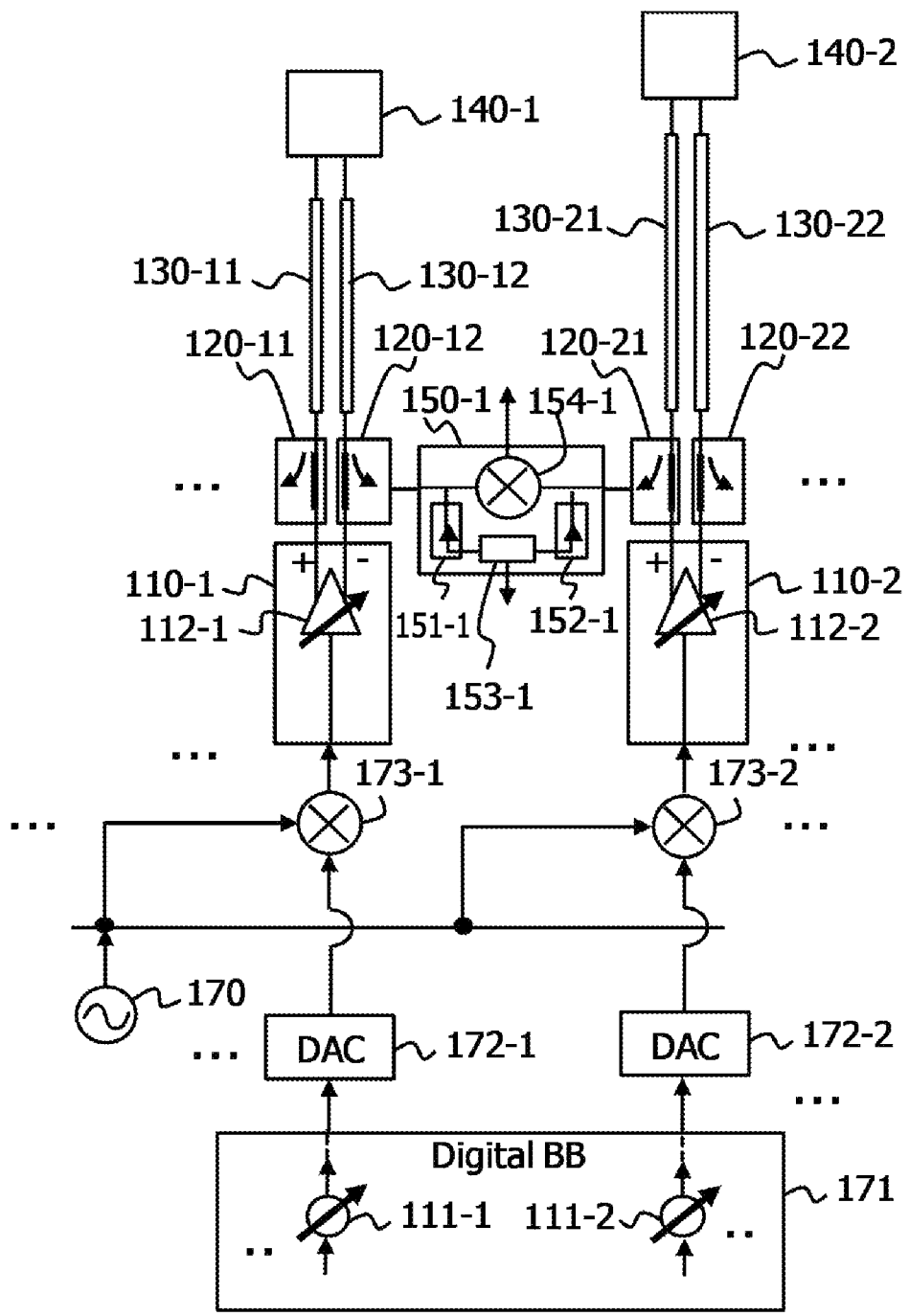
FIGS. 9A and 9B are diagrams illustrating an exemplary configuration of the antenna device.

FIG. 9A illustrates an example in which the variable phase shifters 111-1 and 111-2 are installed in the digital BB unit 171. In the example described above, an example has been described in which the variable phase shifters 111-1 and 111-2 are installed on the analog side. However, as illustrated in FIG. 9A, the variable phase shifters 111-1 and 111-2 may be installed on the digital side. In this case, the phase amplitude controller 100 can output the instruction signals being the digital signals as it is to the variable phase shifters 111-1 and 111-2 without converting the instruction signals into analog signals by the DAC 102. In this case, phase control can be realized by digital control. In a case of FIG. 9A, the positions of the variable phase shifters 111-1 and 111-2 may be replaced with the positions of the variable amplifiers 112-1 and 112-2. On the digital side, not only the phase but also the amplitude can be made variable.

Figure 9B:
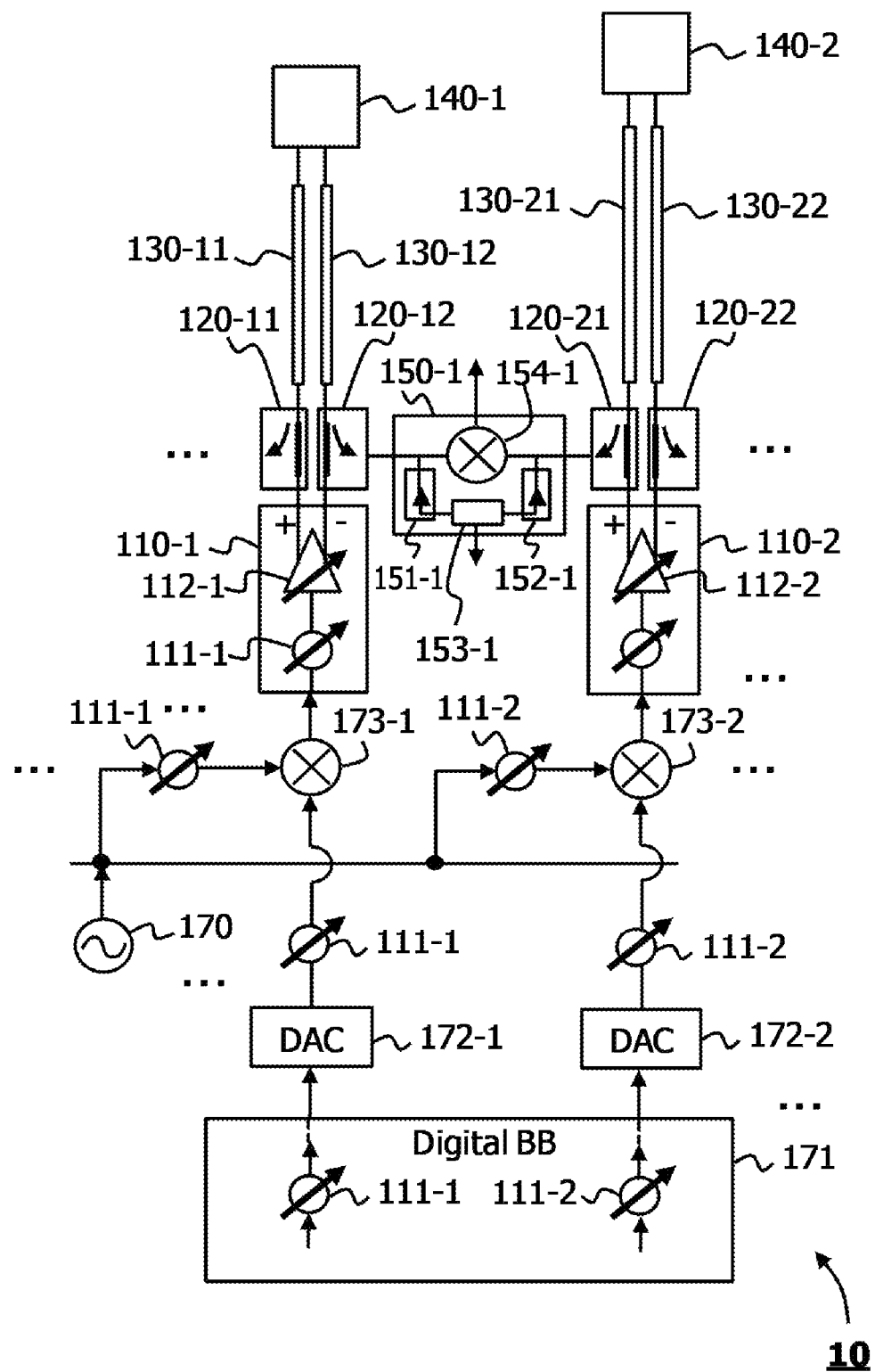

FIG. 9B is a diagram illustrating an exemplary configuration of the antenna device 10 in a case where all the examples in FIGS. 8A to 9A are included. As illustrated in FIG. 9B, the variable phase shifters 111-1 and 111-2 are installed on both of the analog side (or immediately below antenna) and the digital side (or digital BB unit 171). By controlling the phase and the amplitude between the antenna elements 140-1 and 140-2 on both of the analog side and the digital side, it is possible to perform calibration and beamforming.

Note that the variable phase amplifiers 110-1 to 110-4 may operate in a baseband frequency band of the digital BB unit 171. In this case, the variable phase amplifiers 110-1 and 110-2 illustrated in FIGS. 9A and 9B may be provided between mixers 173-1 and 173-2 and the digital BB unit 171 or may be provided in the digital BB unit 171. Moreover, the variable phase amplifiers 110-1 to 110-4 may operate on the digital side. In this case, in FIGS. 9A and 9B, the variable phase amplifiers 110-1 and 110-2 are provided, for example, between the digital BB unit 171 and the DACs 172-1 and 172-2 or in the digital BB unit 171. With this structure, for example, the variable phase amplifiers 110-1 and 110-2 can output first and second signals in the baseband frequency band.

Other Embodiments

In the above embodiments, the shape of each of the antenna elements 140-1 to 140-4 has been described as a square. For example, if the length of each of the antenna elements 140-1 to 140-4 in the same direction as the antenna feed lines 130-11 and 130-12 is λ/2, the antenna elements 140-1 to 140-4 may have a rectangular shape or the like.

Furthermore, in the above embodiments, the arithmetic circuits 101 and 182 have been described. The arithmetic circuits 101 and 182 may be, for example, a processor or a controller such as a CPU, a Digital Signal Processor (DSP), a Micro Processing Unit (MPU), or a Field Programmable Gate Array (FPGA). Moreover, the CPU 192 may be a processor or a controller such as a DSP, an MPU, or an FPGA instead of the CPU.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An antenna device comprising:
   a first variable phase amplifier that outputs a first signal to a first transmission line without outputting a second signal to a second transmission line;
   a second variable phase amplifier that outputs a fourth signal to a fourth transmission line without outputting a third signal to a third transmission line;
   a phase comparator that acquires a first reflected signal that is obtained by reflecting the first signal by a first antenna element from the second transmission line, acquires a second reflected signal that is obtained by reflecting the fourth signal by a second antenna element from the third transmission line, and detects a phase difference between the first and the second antenna elements on the basis of the first and the second reflected signals; and
   a phase amplitude controller that calibrates a phase between the first and the second antenna elements on the basis of the detected phase difference, wherein
   signals in opposite phases are output to the first antenna element via the first and the second transmission lines connected to the first antenna element or signals in opposite phases are input from the first antenna element to the first and the second transmission lines and signals in opposite phases are output to the second antenna element via the third and the fourth transmission lines connected to the second antenna element or signals in opposite phases are input to the third and the fourth transmission lines from the second antenna element.

2. The antenna device according to claim 1, comprising:
   instead of the phase comparator, a phase amplitude comparator that acquires the first reflected signal obtained by reflecting the first signal by the first antenna element from the second transmission line, acquires the second reflected signal obtained by reflecting the fourth signal by the second antenna element from the third transmission line, and detects the phase difference and an amplitude difference between the first and the second antenna elements on the basis of the first and the second reflected signals, wherein
   the phase amplitude controller calibrates a phase and an amplitude between the first and the second antenna elements on the basis of the detected phase difference and amplitude difference.

3. The antenna device according to claim 1, wherein
   the second transmission line and the third transmission line are connected to the phase comparator or the phase amplitude comparator, and the first transmission line and the fourth transmission line are connected to the phase comparator or the phase amplitude comparator, respectively via the first and the second antenna elements and the second and the third transmission lines.

4. The antenna device according to claim 1, wherein
   the first and the second variable phase amplifiers output the first and the fourth signals in a frequency band same as an operation frequency of the first and the second antenna elements.

5. The antenna device according to claim 4, further comprising:
   a frequency converter that converts a frequency of a baseband signal in a frequency band lower than the operation frequency of the first and the second antenna elements into the operation frequency, wherein
   the first and the second variable phase amplifiers are provided between the frequency converter and the first and the second antenna elements.

6. The antenna device according to claim 4, further comprising:
   a digital baseband unit that outputs a baseband signal in a frequency band lower than the operation frequency of the first and the second antenna elements; and
   a frequency converter that converts a frequency of the baseband signal into the operation frequency, wherein
   the first and the second variable phase amplifiers are provided in the digital baseband unit or between the digital baseband unit and the frequency converter.

7. The antenna device according to claim 1, wherein
   the first and the second variable phase amplifiers output the first and the second signals in a baseband frequency band lower than the operation frequency of the first and the second antenna elements.

8. The antenna device according to claim 1, further comprising:
   an oscillator that outputs a local signal in a local signal frequency band; and
   a frequency converter that converts a frequency of a baseband signal into a wireless frequency band on the basis of the local signal, wherein
   the first and the second variable phase amplifiers respectively include a first and a second variable phase shifters that change a phase of an input signal, and
   the first and the second variable phase shifters are provided between the oscillator and the frequency converter.

9. The antenna device according to claim 1, further comprising:
   an inter-element calibrator, wherein
   the first variable phase amplifier outputs the first signal of a first frequency and the first signal of a second frequency, and the second variable phase amplifier outputs the second signal of the first frequency and the second signal of the second frequency,
   the phase comparator or the phase amplitude comparator detects a first phase difference corresponding to the first frequency on the basis of the first reflected signal corresponding to the first frequency and the second reflected signal corresponding to the first frequency and a second phase difference corresponding to the second frequency on the basis of the first reflected signal corresponding to the second frequency and the second reflected signal corresponding to the second frequency, and the inter-element calibrator detects a phase difference between the first and the second antenna elements on the basis of the first and the second phase differences.

10. The antenna device according to claim 1, further comprising:
an inter-element calibrator that outputs, to the phase amplitude controller, an instruction signal indicating, when phase difference or a phase difference and an amplitude difference between the first and the second antenna elements are detected, to detect a phase difference or a phase difference and an amplitude difference between the first antenna element and a third antenna element of which detection the phase difference or the phase difference and the amplitude difference between the antenna elements is not terminated and to detect a phase difference or a phase difference and an amplitude difference between the second antenna element and a fourth antenna element of which detection of the phase difference or the phase difference and the amplitude difference between the antenna elements is not terminated;
a third variable phase amplifier connected to the third antenna element; and
a fourth variable phase amplifier connected to the fourth antenna element, wherein
the phase amplitude controller, in accordance with the instruction signal, outputs an instruction signal indicating to perform calibration between the first antenna element and the third antenna element to the first and the third variable phase amplifiers and outputs an instruction signal indicating to perform calibration between the second antenna element and the fourth antenna element to the second and the fourth variable phase amplifiers.

11. A calibration method of an antenna device including a first and second variable phase amplifiers, a phase comparator, and a phase amplitude controller, in which signals in opposite phases are output to a first antenna element via first and second transmission lines connected to the first antenna element or signals in opposite phases are input from the first antenna element to the first and the second transmission lines and signals in opposite phases are output to a second antenna element via third and fourth transmission lines connected to the second antenna element or signals in opposite phases are input to the third and the fourth transmission lines from the second antenna element, the method comprising:
outputting the first signal to the first transmission line without outputting a second signal to the second transmission line by the first variable phase amplifier;
outputting a fourth signal to the fourth transmission line without outputting a third signal to the third transmission line by the second variable phase amplifier;
acquiring a first reflected signal that is obtained by reflecting the first signal by the first antenna element from the second transmission line, acquiring a second reflected signal that is obtained by reflecting the fourth signal by the second antenna element from the third transmission line, and detecting a phase difference between the first and the second antenna elements on the basis of the first and the second reflected signals by the phase comparator; and
calibrating a phase and an amplitude between the first and the second antenna elements on the basis of the detected phase difference by the phase amplitude controller.

* * * * *